United States Patent [19]

Ishii et al.

[11] Patent Number: 5,689,478
[45] Date of Patent: Nov. 18, 1997

[54] MAGNETIC HEAD FOR MAGNETO-OPTICAL RECORDING AND MAGNETO-OPTICAL RECORDING APPARATUS IN WHICH A MAGNETIC CORE MOUNTED TO A SLIDER HAS PARTICULAR DIMENSIONS AND PROPERTIES

[75] Inventors: Kazuyoshi Ishii, Tokyo; Shinichi Tachibana, Machida, both of Japan

[73] Assignee: Canon Kabushiki Kaisha, Tokyo, Japan

[21] Appl. No.: 518,219

[22] Filed: Aug. 23, 1995

Related U.S. Application Data

[63] Continuation of Ser. No. 132,338, Oct. 6, 1993, abandoned.

[30] Foreign Application Priority Data

| | | | |
|---|---|---|---|
| Oct. 9, 1992 | [JP] | Japan | 4-296591 |
| Dec. 1, 1992 | [JP] | Japan | 4-343534 |

[51] Int. Cl.$^6$ .................................... G11B 11/00
[52] U.S. Cl. .................. 369/13; 360/114; 360/59
[58] Field of Search ................. 369/13, 14, 44.39; 360/66, 114, 59, 103, 60, 125, 119; 365/122

[56] References Cited

U.S. PATENT DOCUMENTS

| | | | |
|---|---|---|---|
| 4,796,241 | 1/1989 | Hayakawa et al. | 369/13 |
| 5,107,471 | 4/1992 | Miyake et al. | 369/13 |
| 5,138,567 | 8/1992 | Mehrgardt | 364/724.01 |
| 5,485,435 | 1/1996 | Matsuda et al. | 369/13 |

FOREIGN PATENT DOCUMENTS

| | | |
|---|---|---|
| 50-107121 | 9/1976 | Japan . |
| 59-215008 | 12/1984 | Japan . |
| 60-48806 | 10/1985 | Japan . |
| 63-217548 | 9/1988 | Japan . |
| 3-45024 | 2/1991 | Japan . |

OTHER PUBLICATIONS

Patent Abstracts of Japan, Kokai No. 04-82065, vol. 16, No. 305, Jul. 1992.
Patent Abstracts of Japan, Kokai No. 04-119503, vol. 16, No. 377, Aug. 1992.
Patent Abstracts of Japan, Kokai No. 01-236412, vol. 13, No. 566, Dec. 1989.

*Primary Examiner*—Ali Neyzari
*Attorney, Agent, or Firm*—Fitzpatrick, Cella, Harper & Scinto

[57] ABSTRACT

A magnetic head for magneto-optical recording includes a slider sliding on a magneto-optical recording medium, a core made of a magnetic material and mounted to the slider, and a coil wound around the core. The core has an area of a main magnetic pole end face of from 0.01 mm$^2$ to 0.039 mm$^2$. The magnetic material for the core is a Mn—Zn ferrite having a Curie temperature of not less than 140° C., a permeability of not less than 200 at frequency 8 MHz at temperature 25° C., and an effective saturation magnetic flux density of not less than 4400 G. A magneto-optical recording apparatus includes an optical head for irradiating a magneto-optical recording medium with a light spot, and a magnetic head for applying a magnetic field to the magneto-optical recording medium. The magnetic head includes a slider sliding on the magneto-optical recording medium, a core made of a magnetic material and mounted to the slider, and a coil wound around the core. Upon application of a voltage to the coil a modulation magnetic field is applied to a recording surface of the magneto-optical recording medium to record an information signal with a maximum frequency of not less than about 8 MHz.

26 Claims, 14 Drawing Sheets

MAGNETIC HEAD FOR MAGNETO-OPTICAL RECORDING AND MAGNETO-OPTICAL RECORDING APPARATUS IN WHICH A MAGNETIC CORE MOUNTED TO A SLIDER HAS PARTICULAR DIMENSIONS AND PROPERTIES

This application is a continuation of application Ser. No. 08/132,338 filed Oct. 6, 1993, now abandoned.

BACKGROUND OF THE INVENTION

1. Field of the Invention

The present invention relates to a magnetic head for magneto-optical recording and a magneto-optical recording apparatus, which are for recording information signals in a magneto-optical recording medium by the magnetic modulation method.

2. Related Background Art

There are conventionally known magneto-optical recording apparatus for recording information at high density in a magneto-optical recording medium such as a magneto-optical disk, which employ the magnetic modulation method. In the magnetic modulation method a laser beam irradiates a recording medium in the form of a light spot focused in a diameter of about 1 μm and a magnetic head applies a magnetic field modulated according to information signals to the laser beam irradiating portion, whereby the information signals are recorded.

The generally known magneto-optical recording apparatus employing the magnetic modulation method are constructed for example as shown in FIG. 1. A magneto-optical recording medium 31 used therein is in the form of a disk in which a signal recording layer is formed on a transparent substrate. The disk 31 is driven to rotate by a spindle motor 30. A floating magnetic head 20 is disposed above the disk 31 while an optical head 21 is disposed below the disk 31 to be opposed to the magnetic head 20. The magnetic head 20 is held at the fore end of suspension 23 and a connecting member 22 connects between the optical head 21 and the fixed end of suspension 23, constituting a magneto-optical recording head unit. The connecting member 22 is fixed to a linear motor 24, so that with movement of the linear motor 22 the optical head 21 and the magnetic head 20 move together in the radial direction of disk 31.

The information signals are recorded as follows in the disk 31 in the magneto-optical recording apparatus employing the magnetic modulation method. While the disk 31 is rotated at high speed by the spindle motor 30, a laser beam 26 is guided from the optical head 21 to irradiate the signal recording layer in the disk 31 in the form of light spot 26s focused in a diameter of about 1 μm. The irradiation increases the temperature of the signal recording layer up to above the Curie temperature thereof. At the same time, the magnetic head 20 applies a bias magnetic field modulated according to the information signals to the temperature-elevated portion. The application of the magnetic field aligns the direction of magnetization in the signal recording layer to the direction of the bias magnetic field to effect recording of information signals on the signal recording layer.

As shown in the overall perspective view in FIG. 2, in the partial cross-sectional view in FIG. 3A and in the bottom plan view in FIG. 3B, the magnetic head 20 is of a composite type in which a slider 28 is made of a non-magnetic material, for example a ceramic, and a U-shaped core 25 made of a high-permeability magnetic material, for example a ferrite, is fixed to the end of the slider 28. The open end of core 25 is on the side of the slider bottom surface. A coil 27 is wound around a main magnetic pole 25b, which is a leg of the core 25. When a current modulated according to the information signals by a drive circuit 19 is supplied to the coil 27, a perpendicular magnetic field B is generated as directed from a magnetic pole end face 25a to the recording medium.

However, the strength of the magnetic field generated from the magnetic pole end face 25a is sufficiently high and uniform only immediately below the magnetic pole end face 25a. Therefore, if the laser beam 26 from the optical head 21 should not be focused as the light spot 26s on the recording medium immediately below the magnetic pole end face 25a, a magnetic field strong enough to record the information signals would not be able to be applied to the laser irradiating portion, resulting in failure of correct signal recording.

In the conventional magneto-optical recording apparatus, the maximum permissible error of position is ±0.15 mm between the magnetic pole end face 25a of the magnetic head and the light spot because of the limit of dimensional precision possibly achievable in producing the magnetic head, optical head and connecting member connecting therebetween and because of the limit of mechanical positioning precision in assembling them, and therefore the size of magnetic pole end face 25a is determined substantially between about 0.4 mm×0.4 mm and 0.6 mm×0.6 mm, considering all error factors including the foregoing, to surely position the light spot immediately below the magnetic pole end face 25a.

Nevertheless, the recent demand is high for higher-density information signal recording and for higher information signal transfer speed in an information recording apparatus including the magneto-optical recording apparatus. To meet the demand, the maximum frequency of information signals to be recorded is required to increase up to about 10 MHz. It was, however, conventionally difficult to fully reduce the size of the magnetic pole end face because of the question of position in precision between the magnetic head and the light spot, as described above.

Generally, the inductance of a coil is approximately proportional to the cross section of the magnetic pole and to a square of a winding number thereof. If the magnetic pole end face is sized in the range of 0.4 mm×0.4 mm to 0.6 mm×0.6 mm, the inductance is large, above 3 μH. In order that a current of high frequency is supplied to the magnetic head with large inductance, a very large voltage must be applied, which will increase the dissipation power of the drive circuit. Practically, the maximum frequency of recorded information signals is thus about 5 MHz.

If the number of turns in the coil is decreased to lower the inductance, the supply current must be increased with the decrease of winding number. Therefore, this is not a practical means, either, considering the dissipation power of the drive circuit.

Meanwhile, Applicant already established a technique to enhance the positioning precision between the main pole end face of a magnetic head and the light spot up to about ±0.01 mm by a "magnetic head positioning apparatus" as described for example in the specification of Japanese Patent Application No. 4-223610. This apparatus permits the light spot to be positioned relative to a main magnetic pole end face sized to about 0.1 mm×0.1 mm.

However, for example if the conventional example as shown in FIGS. 3A and 3B were modified simply to reduce the size of main magnetic pole 25b (for example down to 0.1 mm×0.1 mm) as shown in FIGS. 4A and 4B, the following negative effect would be caused, also resulting in failing to obtain a satisfactory result.

First, in the magnetic flux generated by the main magnetic pole 25b a ratio of magnetic flux B' leaking from the side faces of main magnetic pole 25b relatively increased while in effective magnetic flux (magnetic field) B applied from the magnetic pole end face 25a of the main magnetic pole 25b to the disk 31 relatively decreases, which decreases the magnetic field generation efficiency of the magnetic head. To compensate for the decrease, an excessive current must be supplied to the coil 27 to apply a sufficient magnetic field to the disk 31, which would increase the power dissipation of the magnetic head drive circuit.

Second, if a sufficient magnetic field were applied to the disk 31 to compensate for the decrease of magnetic field generation efficiency of the magnetic head, as described above, the excessive magnetic flux in the main magnetic pole would increase the flux density, which would enhance the possibility of saturation of magnetic flux in the main magnetic pole. This must make it difficult to apply a sufficient magnetic field to the disk 31.

Third, since the main magnetic pole becomes thinner, the mechanical strength thereof would be insufficient, which is liable to result in breakage of core 25 in production or in use thereof.

SUMMARY OF THE INVENTION

The present invention has been accomplished to solve the problems in the magnetic head for magneto-optical recording as described above. The invention is characterized in that the magnetic head has a core made of a magnetic material which is a ferrite (Mn—Zn ferrite) containing $Fe_2O_3$, MnO and ZnO as main ingredients and having a Curie temperature of not less than 140° C., a permeability of not less than 200 at a frequency of 8 MHz at a temperature of 25° C., and an effective saturation flux density of not less than 4400 G at a temperature of 25° C.

Further, the invention is characterized in that the material of the core is preferably a Mn—Zn ferrite having a Curie temperature of not less than 170° C., a permeability of not less than 200 at frequency 10 MHz at a temperature 25° C., and an effective saturation flux density of not less than 5000 G, or a Mn—Zn ferrite having a Curie temperature of not less than 200° C., a permeability of not less than 200 at frequency 12 MHz at temperature 25° C., and an effective saturation flux density of not less than 5500 G.

Further, the invention is characterized in that the core is sized such that an area of the main magnetic pole end face is not less than 0.01 mm² but not more than 0.039 mm², an area of the coil winding window is not less than 0.11 mm² but not more than 0.47 mm², and a distance between the main magnetic pole end face and the coil is not less than 0.05 mm but not more than 0.29 mm.

Further, the invention is characterized in that the coil is formed by winding a wire with a conductor cross section of not less than $7 \times 10^{-4}$ mm² but not more than $5 \times 10^{-3}$ mm² and the inductance thereof is not less than 0.4 µH but not more than 2 µH.

In a magneto-optical recording apparatus according to the present invention, the maximum frequency of recorded signals is above about 8 MHz and the apparatus comprises a magnetic head made of a Mn—Zn ferrite having a Curie temperature of not less than 140° C. and an effective saturation flux density of not less than 4400 G as described above. Further, the maximum frequency of recorded signals is preferably above about 10 MHz and the apparatus comprises the magnetic head made of a Mn—Zn ferrite having a Curie temperature of not less than 170° C. and an effective saturation flux density of not less than 5000 G.

Also, a magneto-optical recording apparatus of the present invention preferably has the maximum frequency of recorded signals of above about 12 MHz and comprises a Mn—Zn ferrite having a Curie temperature of not less than 200° C. and an effective saturation flux density of not less than 5500 G.

Also, a magnetic head for magneto-optical recording according to the present invention comprises a magnetic core made of Mn—Zn ferrite having a saturation flux density $B_{10}$ larger than 5400 G at 25° C. or larger than 4200 G at 92° C. and a slider made of a non-magnetic material having a thermal expansion coefficient of not less than $120 \times 10^{-7}$ [1/° C.] but not more than $150 \times 10^{-7}$ [1/° C.] in the temperature range of 20° C. to 500° C., wherein the magnetic core and the slider are bonded to each other by glass bonding.

Further, the invention is characterized in that the non-magnetic material is crystallized glass.

Also, a magnetic head for magneto-optical recording according to the present invention is characterized in that a core and a coil for magnetic field generation are provided on a slider made of a non-magnetic material to apply a magnetic field with a polarity corresponding to recorded information, to a magneto-optical recording medium and that at least a portion of the slider opposed to the magneto-optical recording medium has a surface electrical resistivity of not more than $1 \times 10^{11}$ Ω·cm.

In the present invention, at least the portion of the slider opposed to the magneto-optical recording medium may be arranged to have a surface hardness of Vickers hardness not less than 500. Also, the slider is provided with a wear-resistant, lubricating and anti-static resin material at least in the portion opposed to the magneto-optical recording medium.

Further, the slider may be made of a non-magnetic ceramic containing at least any one of MnO, NiO and MgO as a main ingredient, or a ceramic containing NiO as a main ingredient with at least one or more of CaO, $TiO_2$, MgO and MnO as an additive.

DESCRIPTION OF THE PREFERRED EMBODIMENTS

Figure 1:
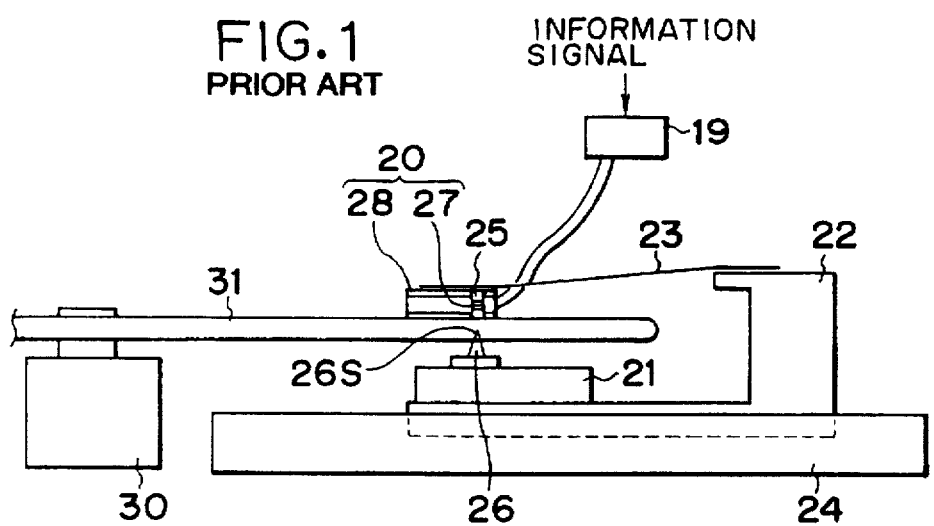
FIG. 1 is a drawing to show the schematic structure of a magneto-optical recording apparatus.
Figure 2:
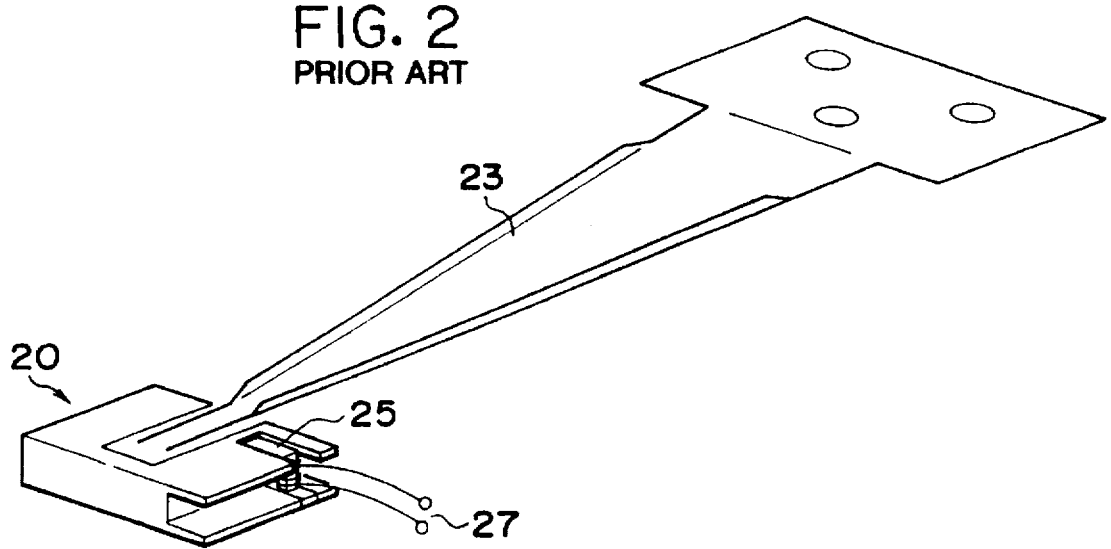
FIG. 2 is a perspective view to show a whole magnetic head.
Figure 3A:
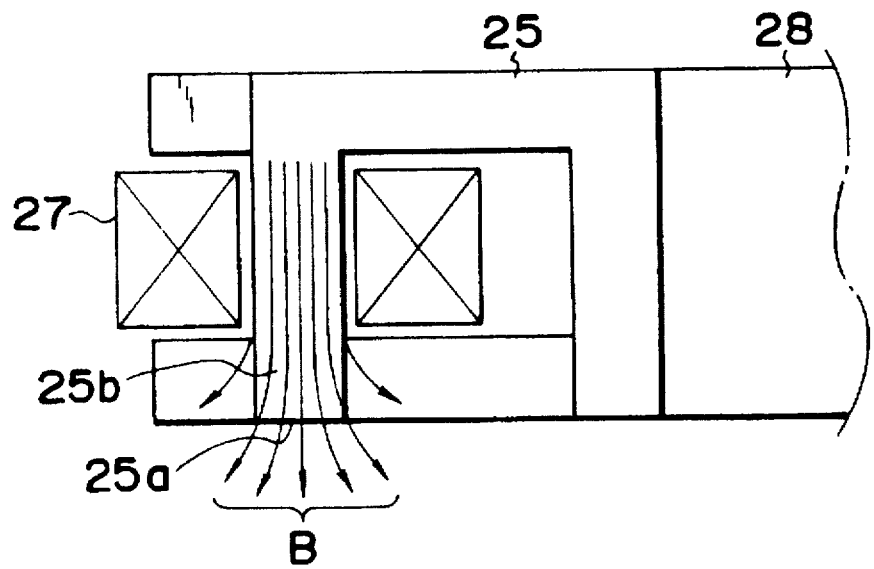
FIG. 3A and FIG. 3B are a partially enlarged view and a bottom view of a conventional magnetic head for magneto-optical recording, respectively.
Figure 3B:
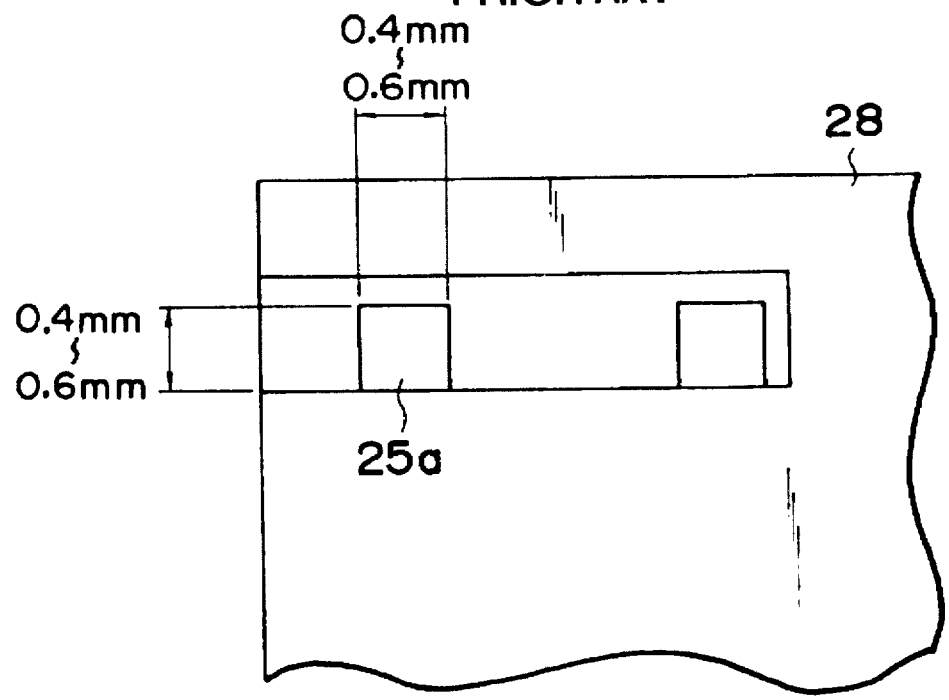
Figure 4A:
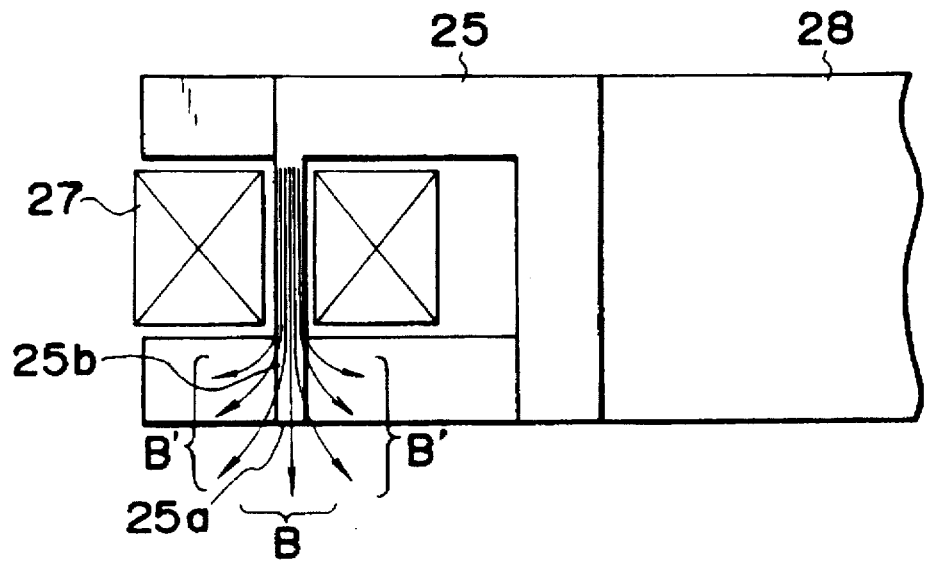
FIG. 4A and FIG. 4B are a partially enlarged view and a bottom view of a conventional magnetic head for magneto-optical recording, respectively.
Figure 4B:
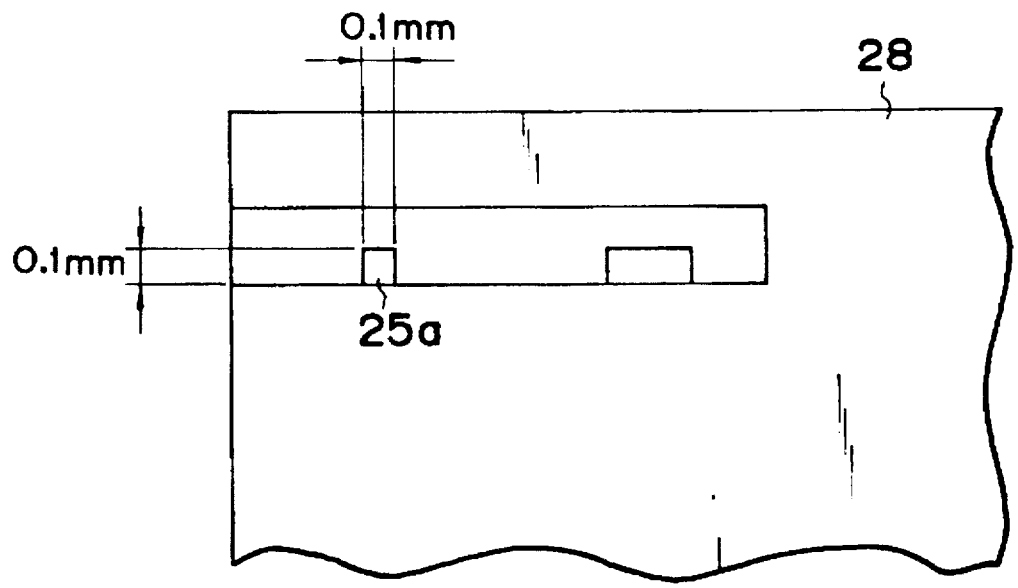
Figure 5A:
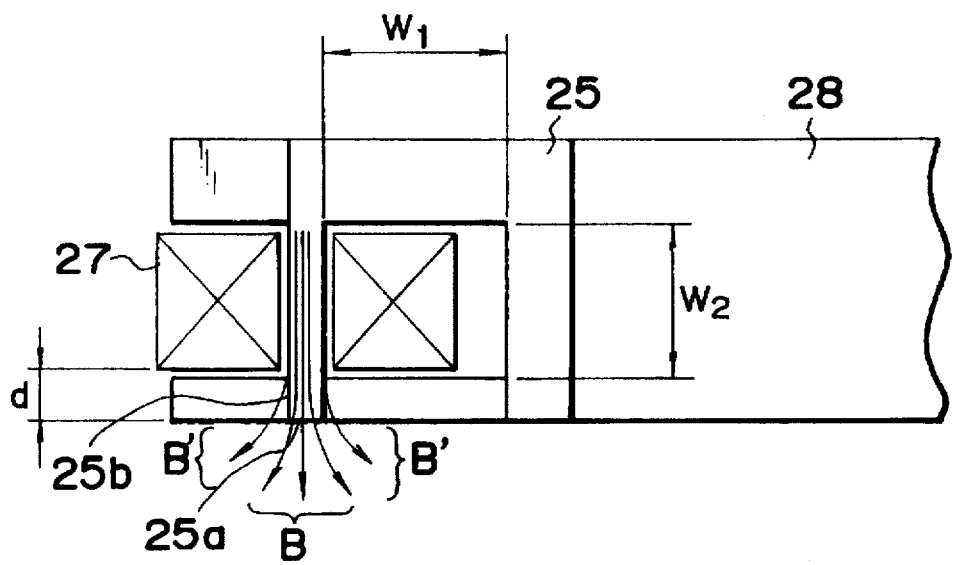
FIG. 5A and FIG. 5B are a partially enlarged view and a bottom view of a magnetic head for magneto-optical recording according to the present invention.
Figure 5B:
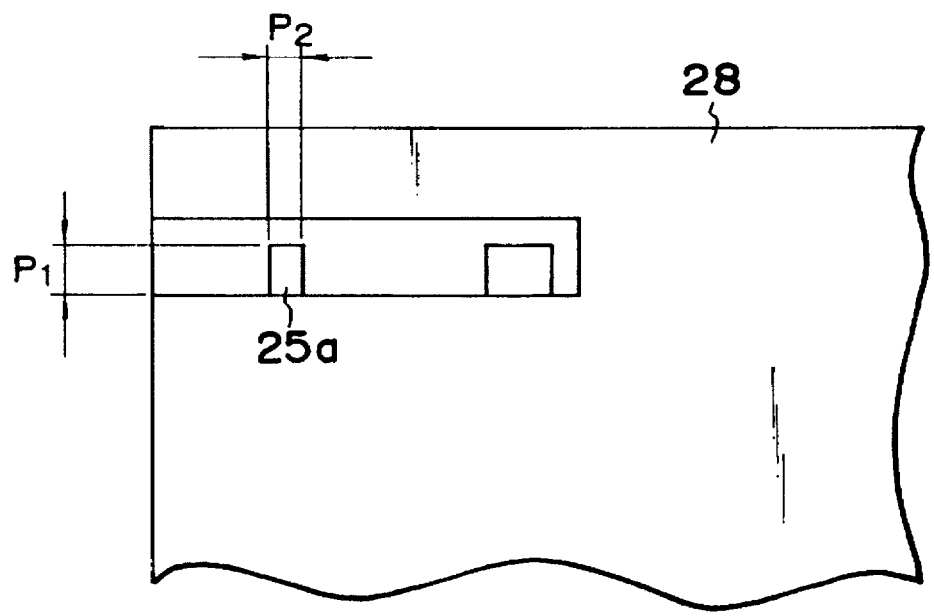
Figure 6:
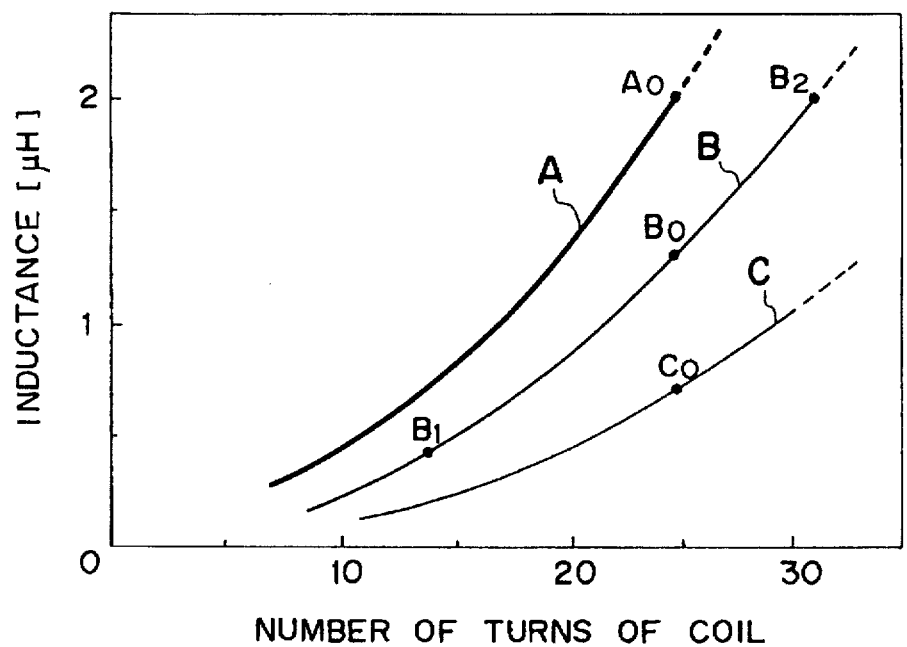
FIG. 6 is a drawing to show the relation between coil winding number and inductance.

Magnetic heads for magneto-optical recording according to the present invention will be described in detail with reference to the drawings. FIG. 5A and FIG. 5B are enlarged views to show a core 25 and its neighbors in a magnetic head for magneto-optical recording according to the present invention, specifically FIG. 5A is a side cross section and FIG. 5B is a bottom view. Next described is the dimension of elements of core 25 in the present embodiment. FIG. 6 is a graph to show the relation between the number of turns of coil 27 and inductance, in which A represents an area $P_1 \times P_2 = 0.039$ mm$^2$ of end face 25a of main magnetic pole, B an area of 0.027 mm$^2$ thereof, and C an area of 0.01 mm$^2$ thereof. The overall structure of the magnetic head for magneto-optical recording according to the present invention as shown in FIG. 5A and FIG. 5B is the same as that shown in FIG. 2 and the magnetic head is used in the magneto-optical recording apparatus shown in FIG. 1.

Figure 7:
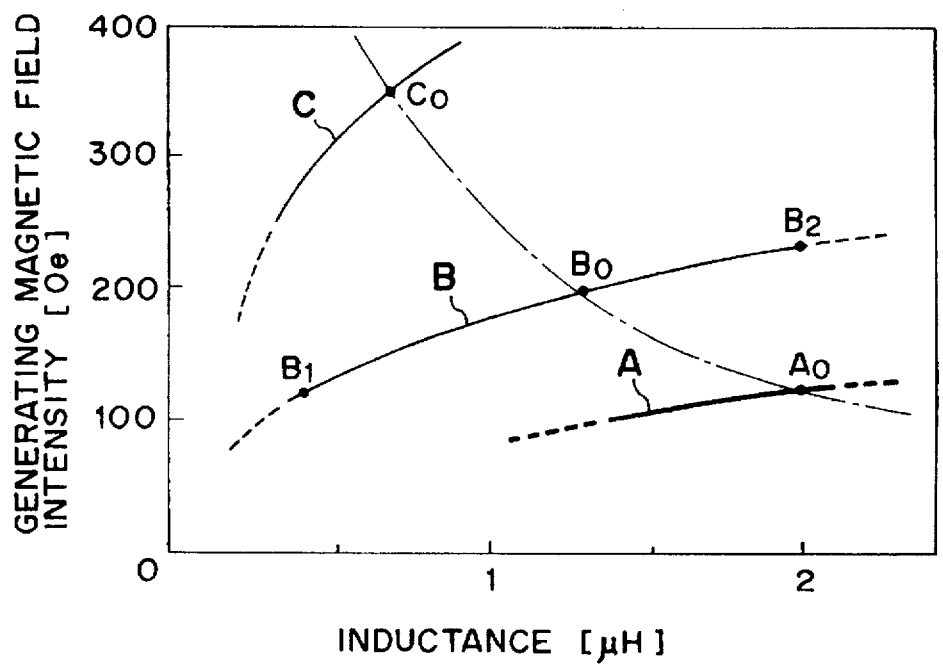
FIG. 7 is a drawing to show the relation between inductance and generating magnetic field intensity.

FIG. 7 shows the relation between inductance and generating magnetic field intensity for coil 27 wound around each core with the main magnetic pole end face 25a shown in FIG. 6 having either one of the above areas. The current supplied to the coil 27 is the maximum current=0.2 A which can be supplied within the practical range of dissipation power in view of the performance of the drive circuit.

Figure 8:
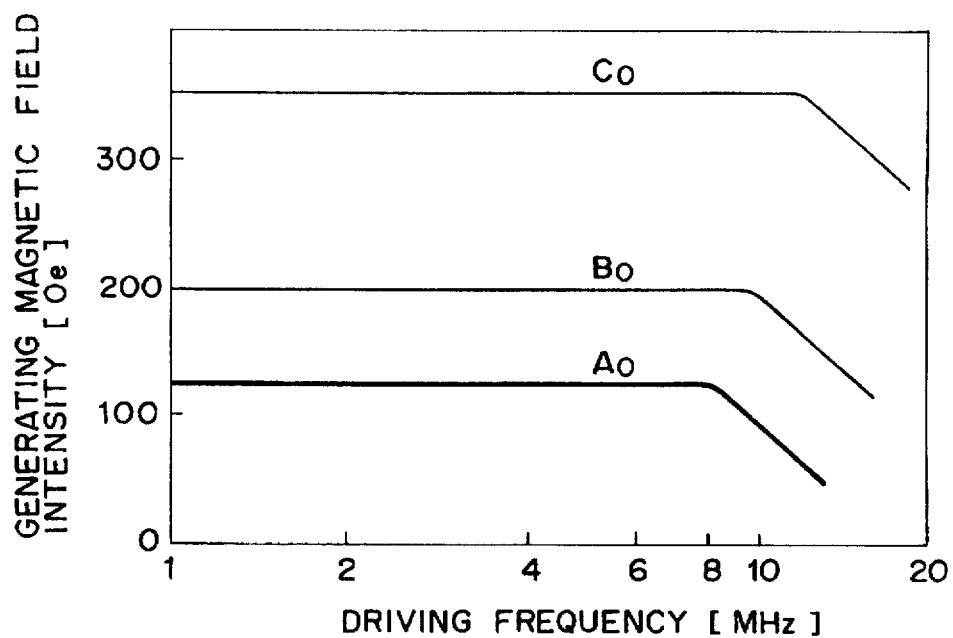
FIG. 8 is a drawing to show the relation between driving frequency and generating magnetic field intensity.

FIG. 8 shows the relation between driving frequency and generating magnetic field intensity for each core with the number of turns of coil $A_0$, $B_0$, $C_0$ being 25 in FIG. 6 under supply of the above current. As for $A_0$, in the practical range of dissipation power in view of the performance of the drive circuit, a constant intensity of generating magnetic field is obtained below a frequency of 8 MHz but the generating magnetic field intensity decreases over 8 MHz. As for $B_0$ and $C_0$, a constant intensity of generating magnetic field is maintained even above 8 MHz. The drop of magnetic field at high frequency is caused by a decrease of supply current because of the performance of the drive circuit in the high frequency zone. Experiments showed that the maximum frequency which could drive the drive circuit was related to the inductance and that the inductance must not be more than 2 μH for drive at a high frequency above 8 MHz. On the other hand, the intensity of the magnetic field generated by the magnetic head must be at least 100 Oe for satisfactory signal recording, preferably not less than 120 Oe.

From the above conditions, the area $P_1 \times P_2$ of the end face of the main magnetic pole in the core must be not more than 0.039 mm$^2$, that is, not more than A (see FIG. 7). On the other hand, the main magnetic pole 25b, however, cannot be slimmer than 0.01 mm$^2$, that is, C from the point of mechanical strength in production and in use of the core. It is thus appropriate to employ such a size of core that the area $P_1 \times P_2$ of an end face of the main magnetic pole is for example 0.027 mm$^2$, that is, B. Even with this area, the inductance exceeds 2 μH if the number of turns of the coil is greater than $B_2$ (31 turns), which is not preferable because the driving frequency is difficult above 8 MHz as described above. In contrast, if the number of turns of the coil is smaller than $B_1$ (14 turns), the inductance becomes lower than 0.4 μH, which is not preferable, either, because the generating magnetic field intensity is insufficient as described above.

In summary, the optimum conditions are as follows: The area $P_1 \times P_2$ of end face 25a of the main magnetic pole in core 25 is not less than 0.01 mm$^2$ but not more than 0.039 mm$^2$ and the inductance is not less than 0.4 μH but not more than 2 μH. It is preferable in actual applications that the end face 25a of the main magnetic pole in core 25 is rectangular and that the length $P_1$ in the radial direction of the disk is slightly longer than the length $P_2$ in the tangential direction of recording tracks, as shown in FIG. 5. This arrangement can prevent the light spot from being deviated from immediately below the main magnetic pole even when the main magnetic pole is displaced relative to the light spot during the tracing (tracking) operation of the light spot for eccentricity of the recording tracks. Accordingly, the effective size $P_1 \times P_2$ of the end face 25a of the main magnetic pole is in the range of from 0.125 mm×0.08 mm (=0.01 mm$^2$) to 0.23 mm×0.17 mm (=0.039 mm$^2$) in actual applications.

Figure 9:
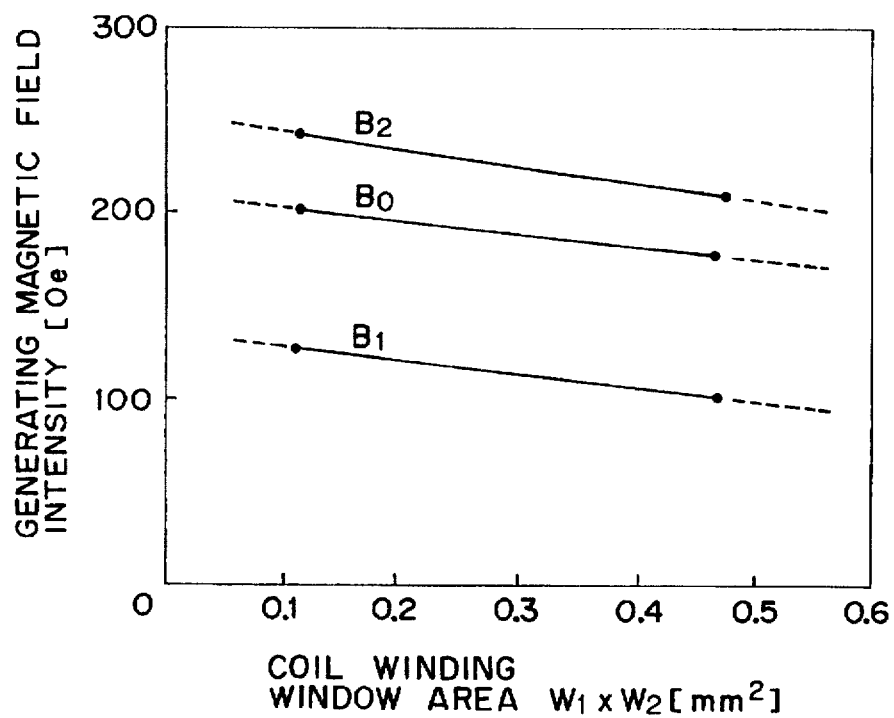
FIG. 9 is a drawing to show the relation between coil winding window area and generating magnetic field intensity.

Next described with the graph shown in FIG. 9 is the relation between generating magnetic field intensity and area $W_1 \times W_2$ of the coil winding window (see FIGS. 5A and 5B) with a supply current of 0.2 A for each core of coil winding number $B_0$, $B_1$, $B_2$ in FIG. 6. The generating magnetic field intensity tends to gradually decrease with an increase of the area $W_1 \times W_2$ of the coil winding window. If the area of the coil winding window is larger than 0.47 mm$^2$, the core of $B_1$ cannot provide a magnetic field intensity of 100 Oe, which is the lowest for satisfactory signal recording. On the other hand, if the area of the coil winding window is smaller than 0.11 mm$^2$, the cross section of wire used for windings of coil 27 must be made smaller, which increases electric resistance of coil 27 and in turn undesirably increases heating upon current supply. Therefore, the most suitable range of area $W_1 \times W_2$ of the coil winding window in core 25 is from 0.11 mm$^2$ to 0.47 mm$^2$.

Figure 10:
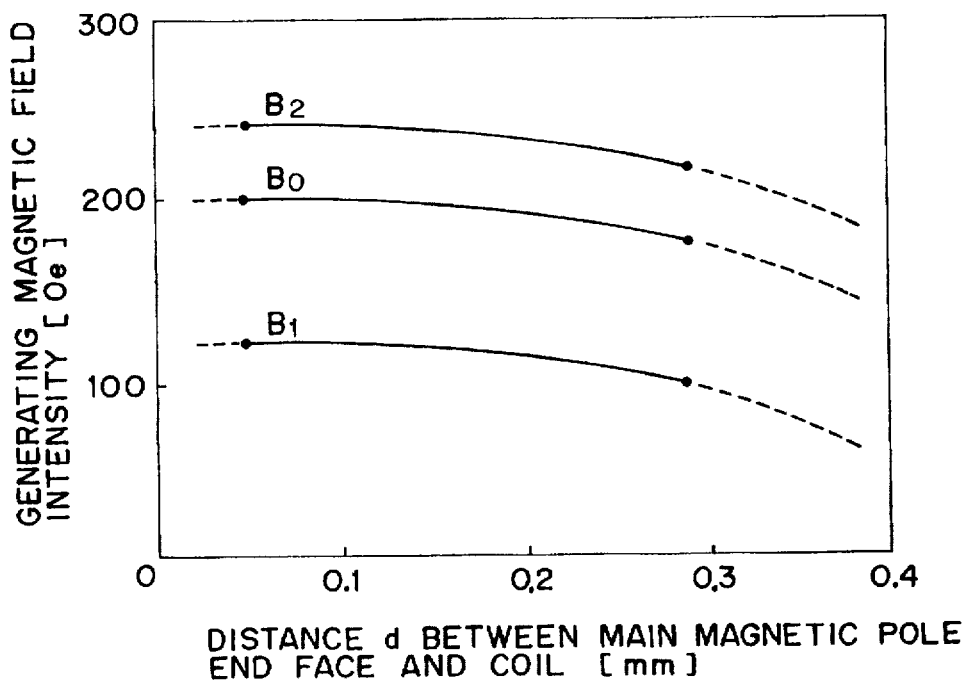
FIG. 10 is a drawing to show the relation between distance between main magnetic pole end face and coil, and generating magnetic field intensity.

Next described with the graph shown in FIG. 10 is the relation between generating magnetic field intensity and distance d (see FIG. 5) between the end face 25a of the main magnetic pole and the coil 27 with a supply current of 0.2 A for each core of coil winding number $B_0$, $B_1$, $B_2$ in FIG. 6. The generating magnetic field intensity tends to gradually decrease with an increase of distance d between the end face of the main magnetic pole and the coil. If the distance d is greater than 0.29 mm, the core $B_1$ cannot provide a magnetic field intensity of 100 Oe, which is the lowest for satisfactory signal recording. On the other hand, if the distance d is shorter than 0.05 mm, the thickness of a connecting portion of main magnetic pole 25b must be also made not more than 0.05 mm together with the decrease of distance d, which makes the mechanical strength of the slider insufficient in production and in use, possibly resulting in breakage thereof. Therefore, the most suitable range of the distance d between the end face 25a of the main magnetic pole and the coil 27 is from 0.05 mm to 0.29 mm.

Figure 11:
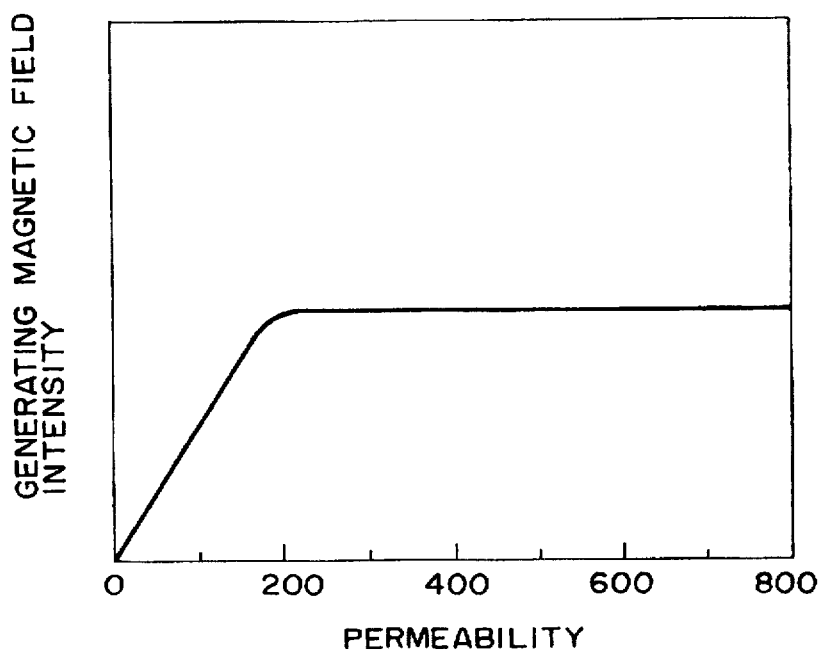
FIG. 11 is a drawing to show the relation between permeability and generating magnetic field intensity.

The dimension of elements in the magnetic head was described above under the assumption that the magnetic properties of magnetic materials for the core are fully effective. Actually, the magnetic field generating capability of the magnetic head greatly depends upon the magnetic properties of the magnetic materials. This is described in the following. The permeability of a magnetic material is first described. Generally, the permeability of a magnetic material decreases with an increase of frequency. In the magnetic head for magneto-optical recording as in the present invention, it is necessary for the permeability of a magnetic material for a core at least to be not less than 200 at the maximum frequency of recording signals. FIG. 11 shows the relation between permeability of a magnetic material for a core and generating magnetic field intensity for a typical example of a magnetic head. As shown, the generating magnetic field intensity is approximately constant if the permeability is sufficiently large. If the permeability becomes lower than 200, the generating magnetic field intensity unpreferably decreases with the decrease of permeability. In a case that the maximum frequency of recording signals is as high as above 8 MHz, the core is preferably made of a Mn—Zn ferrite to obtain such a high permeability.

Figure 13:
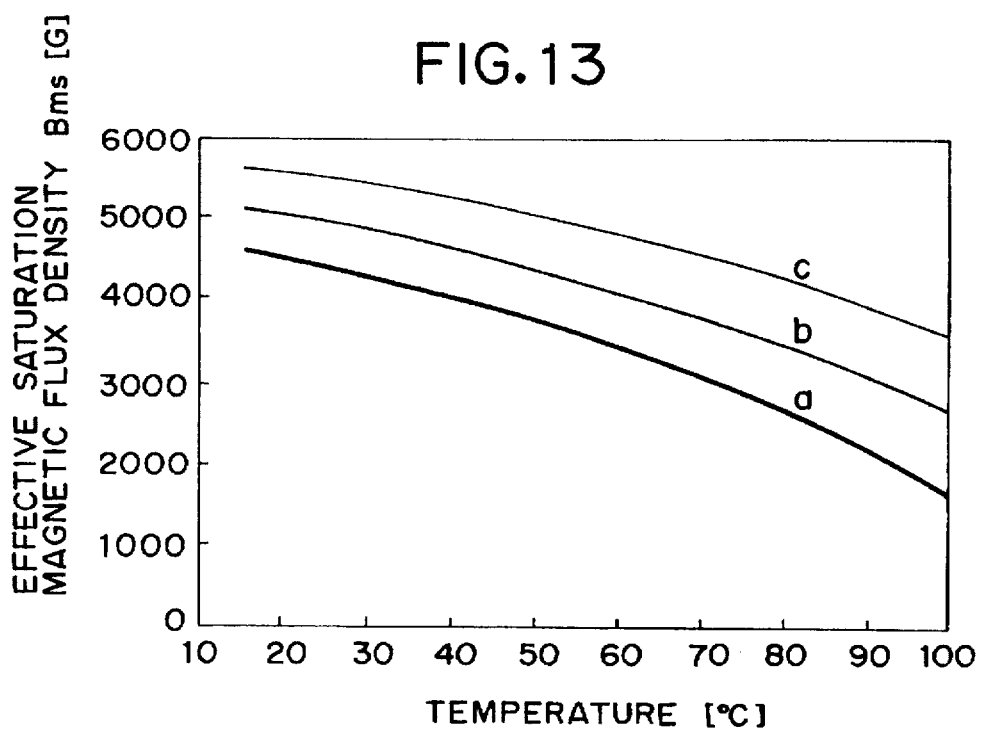
FIG. 13 is a drawing to show the relation between temperature and effective saturation magnetic flux density.

Next described is the relation between Curie temperature of a magnetic material for a core and saturation magnetic flux density. FIG. 13 shows the temperature dependency of effective saturation magnetic flux density Bms for typical Mn—Zn ferrites. A magnetic material a has a Curie temperature of 140° C. and an effective saturation magnetic flux density of 4400 G at 25° C.; a magnetic material b has a Curie temperature of 170° C. and an effective saturation magnetic flux density of 5000 G at 25° C.; a magnetic material c has a Curie temperature of 200° C. and an effective saturation magnetic flux density of 5500 G at 25° C. Generally, the saturation magnetic flux density of Mn—Zn ferrites decreases as the temperature increases. It is seen from FIG. 13 that a material with a higher Curie temperature has a gentle temperature dependency. The effective saturation magnetic flux density Bms is a value of flux density measured with an applied magnetic field of 10 Oe, that is generally described as $B_{10}$.

Figure 12:
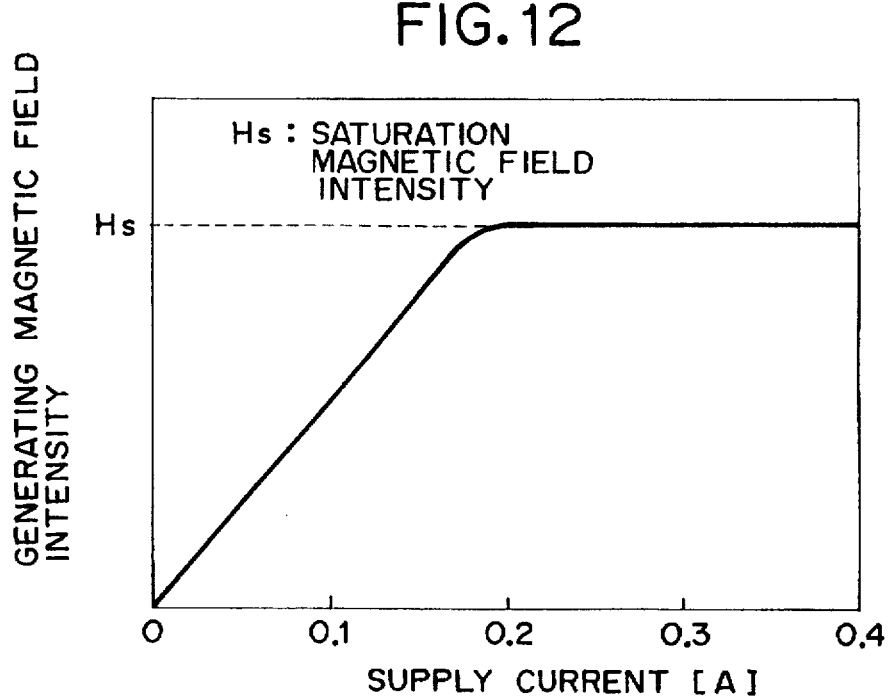
FIG. 12 is a drawing to show the relation between supply current and generating magnetic field intensity.
Figure 14:
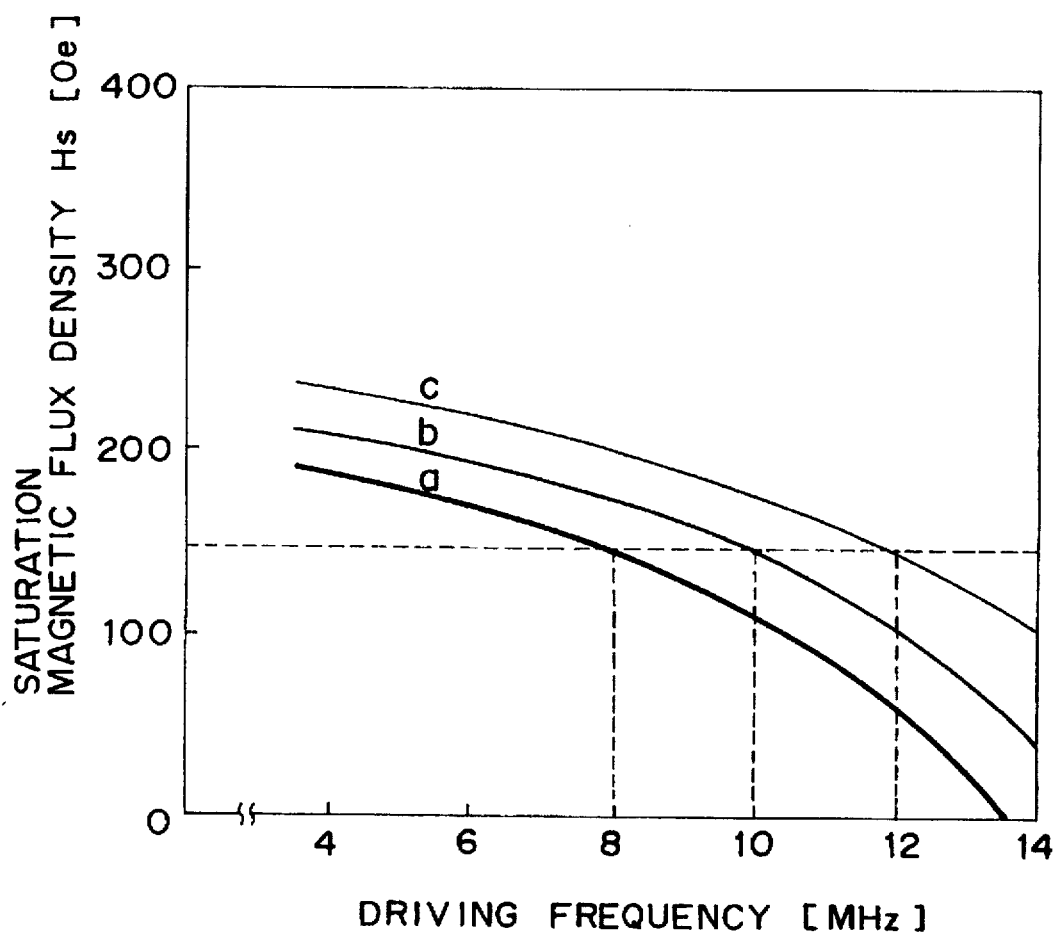
FIG. 14 is a drawing to show the relation between driving frequency and saturation magnetic field intensity.

Since the saturation magnetic flux density of Mn—Zn ferrites is finite as discussed, the magnetic field generated by the magnetic head cannot increase above a certain upper limit. The upper limit is referred to herein as a saturation magnetic field intensity $H_s$. FIG. 12 shows it. As shown, the generating magnetic field intensity is proportional to the supply current in the range of a small intensity of generating magnetic field but it reaches the saturation magnetic field intensity $H_s$ when the supply current is increased to make the flux density in the core equal to the saturation flux density. The generating magnetic field intensity cannot be increased over the saturation magnetic field intensity $H_s$ when the supply current is increased to make the flux density in the core equal to the saturation flux density. The generating magnetic field intensity cannot be increased over the saturation magnetic field intensity $H_s$. The saturation magnetic field intensity $H_s$ of the magnetic head is related to the saturation flux density of magnetic materials used for the core. Since the saturation magnetic flux density has the temperature dependency in the Mn—Zn ferrites and especially since the drive current is relatively large and the driving frequency is high in the magnetic head for magneto-optical recording, as described above, a temperature rise in the core mainly due to high-frequency loss of the magnetic head lowers the saturation flux density, which is a phenomenon observed by the inventors. Based on such a fact, experiments were conducted to check the relation between driving frequency of the magnetic head and saturation magnetic field intensity $H_s$. FIG. 14 shows the result of experiments. Cores used in the experiments had the optimum size within the range of dimensions as described above and were made of the typical materials a, b, c of Mn—Zn ferrite as described above. It is preferable in actual use that the operation range of the magnetic head is set slightly lower than the saturation magnetic field intensity $H_s$ and in the range in which the drive current is proportional to the generating magnetic field. Thus, if the generating magnetic field is 100 Oe, the saturation magnetic field intensity $H_s$ should be not less than 150 Oe. From FIG. 14, this condition is satisfied by the following cases: Specifically, a magnetic head is made of the magnetic material a, which is the Mn—Zn ferrite having a Curie temperature of 140° C. and an effective saturation flux density $B_{10}$ of 4400 G at 25° C., and the maximum driving frequency is about 8 MHz; Also, a magnetic head is made of the magnetic material b, which is the Mn—Zn ferrite having a Curie temperature of 170° C. and an effective saturation flux density $B_{10}$ of 5000 G at 25° C., and the maximum driving frequency is about 10 MHz; Further, a magnetic head is made of the magnetic material c, which is the Mn—Zn ferrite having a Curie temperature of 200° C. and an effective saturation flux density $B_{10}$ of 5500 G at 25° C., the maximum driving frequency is about 12 MHz. It is thus important that the core of the magnetic head be made of a magnetic material having preferable magnetic properties depending upon the maximum frequency of recording signals. All the materials a, b, c of Mn—Zn ferrite used in the description of the present embodiment are mass-producible by the presently available production techniques.

Figure 15A:
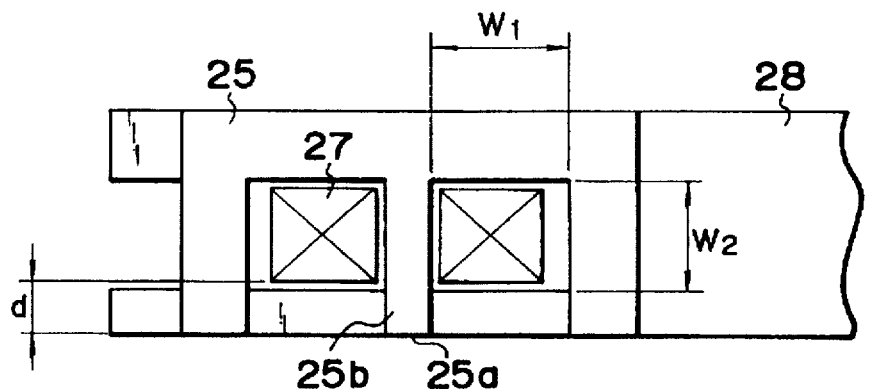
FIGS. 15A to 15C are drawings to show other embodiments different in core shape from each other.
Figure 15B:
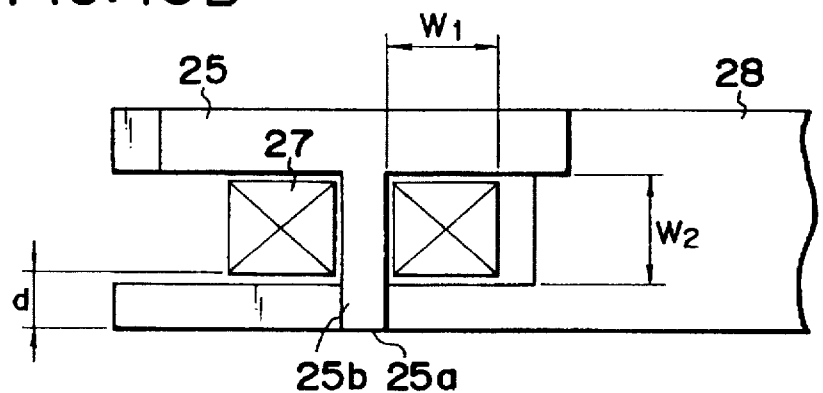
Figure 15C:
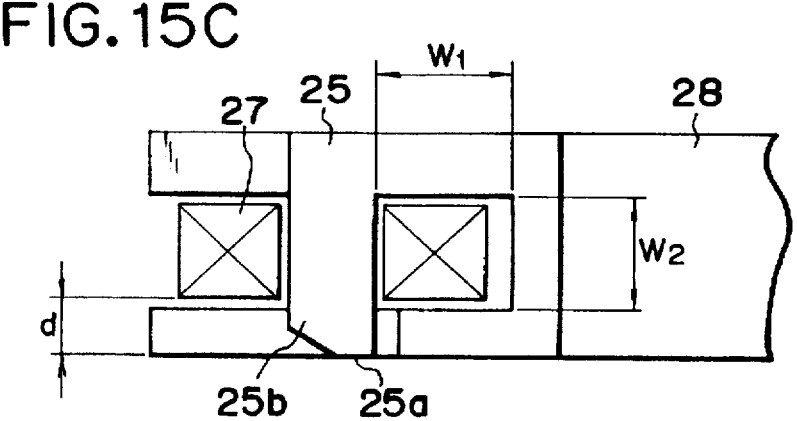

The shape of the core is not limited to the U shape as described above. For example, the core may be formed in the shape of an E, T or a ring core with a wide gap as shown in FIG. 15A, FIG. 15B, or FIG. 15C, keeping the same values described in the above embodiment for the area $P_1 \times P_2$ of magnetic pole end face 25a in the core, the area $W_1 \times W_2$ of the coil winding window, and the distance d between the main magnetic pole end face 25a in the core, the area $W_1 \times W_2$ of the coil winding window, and the distance d between the main magnetic pole end face 25a and the coil 27. With the core of T-shape shown in FIG. 15B, there is no magnetic pole opposed to the main magnetic pole 25b, which should define the width $W_1$ of the coil winding window, then the width $W_1'$ of coil 27 is used in place of $W_1$ and $W_1' \times W_2$ may be set within the range of values as described above.

Although the above embodiment showed the example of the composite type in which the magnetic head is fixed to the floating slider made of a non-magnetic material, the present invention can be applied, concerning the magnetic properties of magnetic material forming the core, to a magnetic head of so-called monolithic type in which the floating slider and at least a part of the core are integrally made of a magnetic material. Further, the present invention can be applied to a magnetic head provided with a slider which is adapted to be contactly slid with a disk.

As detailed above, the magnetic head for magneto-optical recording according to the present invention uses as magnetic material for the core the Mn—Zn ferrite having a Curie temperature of not less than 140° C., a permeability of not less than 200 at a frequency 8 MHz at temperature 25° C. and an effective saturation magnetic flux density $B_{10}$ of not less than 4400 G. Further, it preferably uses the Mn—Zn ferrite having a Curie temperature 25° C., and an effective saturation magnetic flux density $B_{10}$ of not less than 5000 G, or the Mn—Zn ferrite having a Curie temperature of not less than 200° C., a permeability of not less than 200 at frequency 12 MHz at temperature 25° C., and an effective saturation magnetic flux density $B_{10}$ of not less than 5500 G.

Also, the magnetic head is characterized in that the end face area of the main magnetic pole in the core is in the range of from 0.01 mm² to 0.039 mm², that the area of the coil winding window is in the range of from 0.11 mm² to 0.47 mm², and that the distance between the main magnetic pole end face and the coil is in the range of from 0.05 mm to 0.29 mm.

In addition, the magnetic head is characterized in that the coil is formed by winding a conductor wire having a cross section of a conductor thereof in the range of from $7\times10^{-4}$ mm² to $5\times10^{-3}$ mm² and that the inductance is in the range of from 0.4 μH to 2 μH.

Accordingly, the magnetic head of the present invention has a high magnetic field generation efficiency for the small inductance as compared to conventional magnetic heads. Even if the maximum frequency of recorded information signals is increased above about 8 MHz, a sufficient magnetic field can be produced for satisfactory signal recording in the allowable range of dissipation power to the drive circuit. There is also no possibility of breaking the core due to insufficient mechanical strength in production or in use of the magnetic head.

Further, a magneto-optical recording apparatus according to the present invention comprises a magnetic head arranged to record recording signals with a maximum frequency not less than about 8 MHz and made of a Mn—Zn ferrite having a Curie temperature of not less than 140° C. and an effective saturation magnetic flux density $B_{10}$ of not less than 4400 G, as described above. Also, the above magneto-optical recording apparatus preferably comprises a magnetic head arranged to record recording signals with a maximum frequency not less than about 10 MHz and made of a Mn—Zn ferrite having a Curie temperature of not less than 170° C. and an effective saturation magnetic flux density $B_{10}$ of not less than 5000 G.

Further, a magneto-optical recording apparatus according to the present invention comprises a magnetic head arranged to record recording signals with a maximum frequency not less than about 12 MHz and made of a Mn—Zn ferrite having a Curie temperature of not less than 200° C. and an effective saturation magnetic flux density $B_{10}$ of not less than 5500 G.

Therefore, the present invention can solve the problem that the generating magnetic field is not strong enough to carry out satisfactory signal recording because the high-frequency loss during high-frequency drive of the magnetic head increases the temperature of the core to decrease the saturation magnetic flux density.

In addition, a magnetic head for magneto-optical recording according to the present invention comprises a slider sliding on a magneto-optical recording medium, a core made of a magnetic material and mounted to the slider, and a coil wound around the core, which performs recording of information signals by applying a voltage to the coil to apply a modulated magnetic field onto a recording surface in the magneto-optical recording medium, wherein the magnetic material forming the core is a Mn—Zn ferrite having a Curie temperature of not less than 140° C., a permeability of not less than 200 at frequency 8 MHz at temperature 25° C., and an effective saturation magnetic flux density $B_{10}$ of not less than 4400 G.

Further embodiments of the present invention will be described below.

Figure 16:
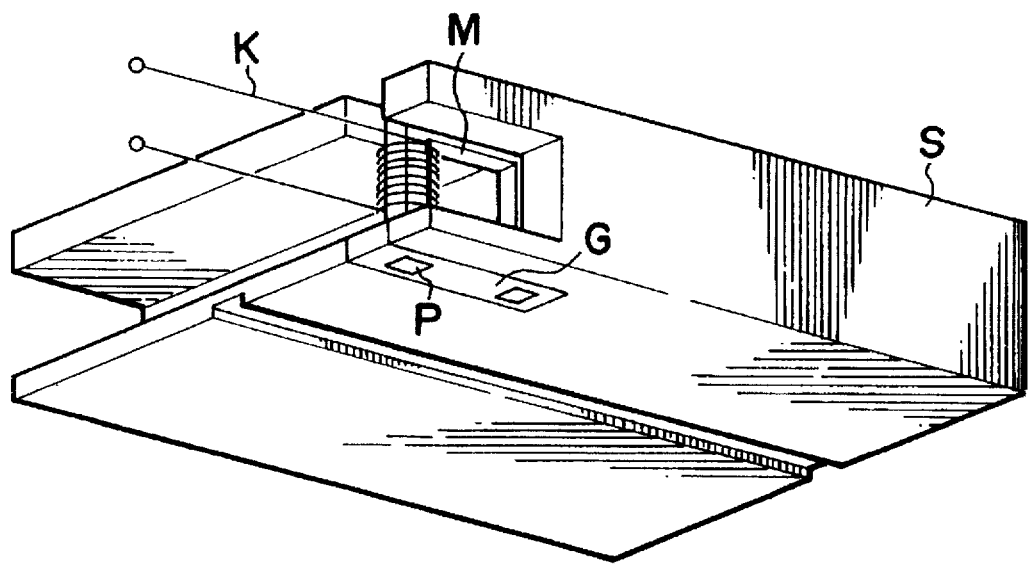
FIG. 16 is a perspective view to show the structure of a magnetic head for magneto-optical recording.
Figure 17:
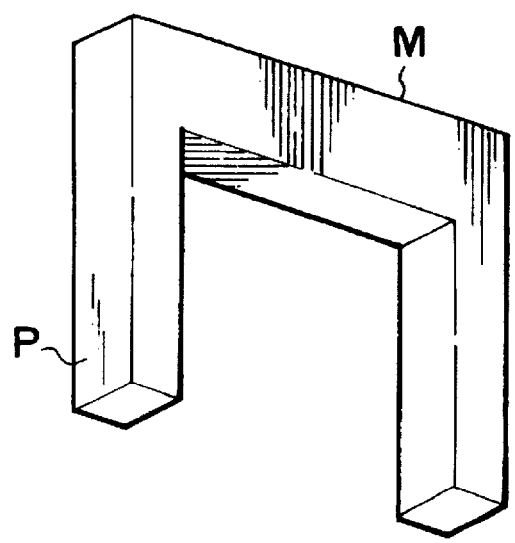
FIG. 17 is an enlarged perspective view to show a magnetic core in a magnetic head for magneto-optical recording.

The floating magnetic head of the composite type for example as shown in FIG. 16 and FIG. 17 is generally used as a magnetic head for magneto-optical recording to record signals in a magneto-optical disk as a magneto-optical recording medium by the magnetic modulation method. Letter M represents a magnetic core of U shape, which is normally made of a Mn—Zn ferrite with high permeability. The magnetic head is mounted to a slider S having an aerodynamic shape of a floatation surface to float and run while keeping a fine gap to the disk by an air flow produced by high-speed rotation of the disk. The slider S is normally made of a non-magnetic ceramic of $CaO-TiO_2$, and the slider S and the magnetic core M are bonded to each other through glass G. The open end of magnetic core M is on the same side as the floating surface of slider S, and coil K is wound around a main magnetic pole P of magnetic core M. The overall structure of the magnetic head for magneto-optical recording according to the present invention as shown in FIG. 16 is the same as that described with FIG. 2, and the magnetic head is used in the magneto-optical recording apparatus shown in FIG. 1.

When a current modulated according to information signals to be recorded is supplied to the coil K, a magnetic field is generated from the end face of main magnetic pole P of magnetic core M in the direction normal to the disk.

The following properties are required for the non-magnetic ceramic forming the slider S.

In the first place, the ceramic must have a hardness enough to prevent wear of slider S upon sliding or rubbing with the disk, which is at least a Vickers hardness of not less than 500 [kg/mm²]. The above ceramic $CaO-TiO_2$ has a Vickers hardness of about 850 [kg/mm²], satisfying this condition.

Secondly, the magnetic core M must be made of a material with a thermal expansion coefficient approximately equal to that of the slider S in order to prevent the magnetic core M, the slider S, or the glass G from being broken due to a difference of thermal expansion coefficient between them when the magnetic core M and the slider S are bonded at a temperature of several hundred degrees by glass bonding in production of the magnetic head. The above ceramic $CaO-TiO_2$ can be produced with an arbitrary thermal expansion coefficient of between $100\times10^{-7}$ and $118\times10^{-7}$ [1/°C.] in the temperature range of from 20° C. to 500° C. by adjusting the composition rate thereof. The Mn—Zn ferrite for magnetic core M is selected to have a thermal expansion coefficient almost coincident with that of the above ceramic $CaO-TiO_2$. Actually, an allowable difference of thermal expansion coefficient between them is about $5 \times 10^{-7}$ [1/°C.] at maximum.

This will be described in more detail.

Table 1 and Table 2 as shown below compare the composition, the thermal expansion coefficient, and the saturation magnetic flux density $B_{10}$ at 25° C. for typical samples of ceramic CaO—$TiO_2$ and Mn—Zn ferrite. $B_{10}$ means a saturation magnetic flux density measured with an applied magnetic field of 10 Oe.

TABLE 1

(ceramic CaO—$TiO_2$)

| Sample | CaO [mol %] | $TiO_2$ [mol %] | Thermal expansion coef. [1/°C.] | Hardness [kg/mm²] |
|---|---|---|---|---|
| $S_1$ | 47 | 53 | $118 \times 10^{-7}$ | 850 |
| $S_2$ | 36 | 64 | $105 \times 10^{-7}$ | 850 |

TABLE 2

(Mn—Zn ferrite)

| Samp. | MnO [mol %] | ZnO [mol %] | $Fe_2O_3$ [mol %] | Thermal expansion coef. [1/°C.] | Saturation flux density $B_{10}$ [G] |
|---|---|---|---|---|---|
| $E_1$ | 23 | 13 | 64 | $145 \times 10^{-7}$ | 6000 |
| $E_2$ | 26 | 16 | 58 | $130 \times 10^{-7}$ | 5700 |
| $E_3$ | 28 | 20 | 52 | $123 \times 10^{-7}$ | 5400 |
| $E_4$ | 33 | 19 | 48 | $105 \times 10^{-7}$ | 4800 |

Comparing the thermal expansion coefficients of ceramic CaO—$TiO_2$ and Mn—Zn ferrite in the above tables, it is seen that a combination between sample $S_1$ of ceramic CaO—$TiO_2$ and sample $E_3$ of Mn—Zn ferrite and a combination between sample $S_2$ of ceramic CaO—$TiO_2$ and sample $E_4$ of Mn—Zn ferrite can be employed.

However, the maximum thermal expansion coefficient is about $123 \times 10^{-7}$ [1/°C.] for the Mn—Zn ferrite matching with sample $S_1$ of ceramic CaO—$TiO_2$. Further, there is no ceramic CaO—$TiO_2$ matching with the Mn—Zn ferrite having a thermal expansion coefficient larger than $123 \times 10^{-7}$ [1/°C.], such as sample $E_1$ or $E_2$ of Mn—Zn ferrite, which have not been actually used.

Giving a supplementary explanation, the thermal expansion coefficient increases as the composition rate of CaO component increases in the ceramic CaO—$TiO_2$. However, an excessive CaO component makes the mirror finish of a floating surface of the slider as described difficult and therefore the composition to maximize the thermal expansion coefficient is actually as shown in sample $S_1$ in the table. Thus, the thermal expansion coefficient cannot be increased over $118 \times 10^{-7}$ [1/°C.] in the ceramic CaO—$TiO_2$.

As described above, the ordinary magnetic head for magneto-optical recording has the slider made of ceramic CaO—$TiO_2$, which has the maximum thermal expansion coefficient for example in the composition such as the sample $S_1$, specifically, the value of which is $118 \times 10^{-7}$ [1/°C.]. On the other hand, the Mn—Zn ferrite forming the magnetic core should have a thermal expansion coefficient approximately coincident with that of ceramic CaO—$TiO_2$ forming the slider (within the allowable difference of $5 \times 10^{-7}$ [1/°C.]) to enable the glass bonding with the slider. Therefore, the composition for example of above sample $E_3$ is selected.

Figure 18:
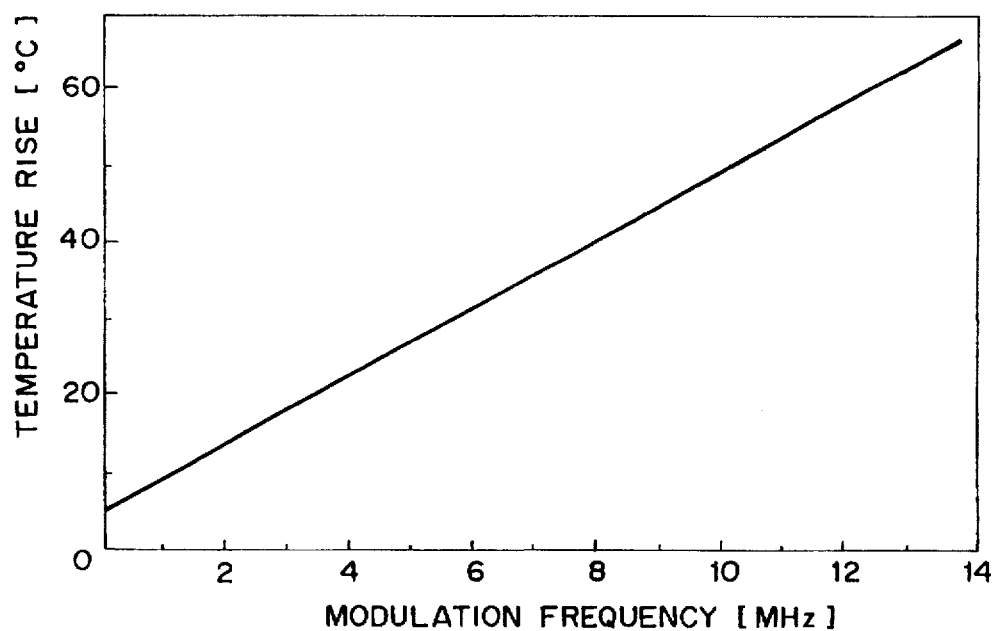
FIG. 18 is a graph to show the relation between modulation frequency of a magnetic field and a temperature rise of a magnetic head.

Incidentally, the recent demand is high for increasing the signal recording speed in a magneto-optical recording apparatus. For this, the magnetic head is required to modulate a magnetic field at higher frequency. It is known that the magnetic head heats because of an increase of high-frequency loss in the magnetic core and coil as the modulation frequency of the magnetic field becomes higher. FIG. 18 is a graph to show an example of the relation between modulation frequency of the magnetic field and temperature rise of the magnetic head, which was obtained in experiments by the inventors. From the graph, the magnetic head temperature increases by about 32° C. with the magnetic field modulation frequency of 6 MHz. Since the actual temperature environment is about 60° C. at maximum inside the magneto-optical recording apparatus, the operation temperature of the magnetic head is about 92° C. at 6 MHz.

Figure 19:
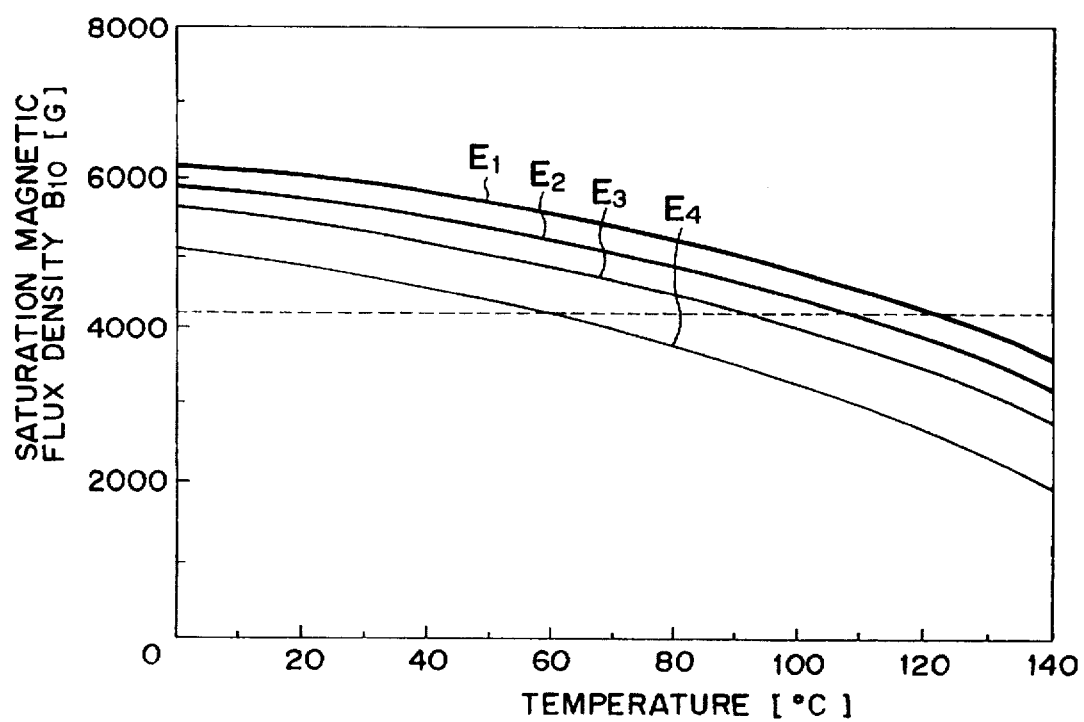
FIG. 19 is a graph to show the relation between temperature and saturation flux density $B_{10}$ for various samples of Mn—Zn ferrite forming the magnetic core.

Furthermore, the Mn—Zn ferrite forming the magnetic core in the magnetic head decreases its saturation magnetic flux density with a temperature rise. For example, FIG. 19 shows the relation between saturation magnetic flux density $B_{10}$ and temperature for samples $E_1$–$E_4$ of Mn—Zn ferrite as described above. Upon generation of the magnetic field, the flux density is high and the saturation of the flux is liable to occur especially inside the main magnetic pole P around which the coil K on which magnetic core M is wound. The saturation of magnetic flux results in failure of generation of a magnetic field strong enough to record signals. In order to avoid the saturation of magnetic flux, it is important to make the magnetic core M of a Mn—Zn ferrite with a sufficiently high saturation magnetic flux density. Generally, the saturation magnetic flux density $B_{10}$ of magnetic core M must be not less than 4200 G (which is the level shown by a broken line in FIG. 19) to generate a magnetic field with sufficient intensity for satisfactory signal recording. The saturation magnetic flux density $B_{10}$ is above 4200 G at a temperature below about 92° C. for sample $E_3$ of Mn—Zn ferrite, and at a temperature below about 60° C. for sample $E_4$.

From the above-described circumstances, the maximum temperature is about 60° C. in the magneto-optical recording apparatus and the high-frequency loss of the magnetic head increases the temperature depending upon the modulation frequency in magnetic modulation. Thus, the magnetic modulation frequency should be not more than 6 MHz to keep the temperature of the magnetic head below 92° C. Accordingly, the magnetic modulation frequency must be below 6 MHz with the ordinary sample $E_3$ of Mn—Zn ferrite.

Also, sample $E_4$ of Mn—Zn ferrite cannot be used taking into consideration the temperature environment in the magneto-optical recording apparatus.

On the other hand, samples $E_1$, $E_2$ have a higher saturation flux density $B_{10}$ than sample $E_3$. Specifically, sample $E_1$, has the saturation flux density $B_{10}$ of not less than 4200 G at a temperature below about 122° C. and sample $E_2$ below about 110° C. If the temperature environment is assumed to be 60° C. in the magneto-optical recording apparatus, the permissible temperature rise is about 62° C. for sample $E_1$ and about 50° C. for sample $E_2$. From these values, it is seen from FIG. 18 that the maximum magnetic modulation frequency is about 12.6 MHz for sample $E_1$ and about 10 MHz for sample $E_2$. Thus, the use of Mn—Zn ferrite with high saturation magnetic flux density $B_{10}$ as a magnetic core is very effective to realize high-speed signal recording.

Nevertheless, there is no CaO—$TiO_2$ with a thermal expansion coefficient approximately equal to that of sample $E_1$ or $E_2$ of Mn—Zn ferrite with a high saturation magnetic flux density $B_{10}$, as described above, and therefore the glass bonding cannot be made between the magnetic core and the slider. Therefore, they have not been used actually.

The problem related to the saturation flux density of the magnetic core is also conventionally known in a floating magnetic head of composite type for a magnetic disk apparatus, which is composed of a slider made of CaO—$TiO_2$ ceramic and a magnetic core made of Mn—Zn ferrite similarly as the magnetic head for magneto-optical recording. A supplementary explanation will be given here with a comparison between them. A recent demand is high for high-density recording of signals in magnetic disk apparatus. In in-plane recording, which is the general magnetic recording method, recording demagnetization, which is a phenomenon specific in high-density signal recording, interferes with satisfactory signal recording. Various attempts were made to increase the coercivity of the recording medium in order to prevent the recording demagnetization. Increasing the coercivity requires an increase of recording magnetic field applied to the recording medium from a magnetic head. However, the Mn—Zn ferrite for the conventional magnetic core provides insufficient saturation flux density $B_{10}$.

This problem is solved by a so-called MIG (Metal In Gap) head in the magnetic head for magnetic disk apparatus, in which a film made of a metal magnetic material such as Sendust with a sufficiently high saturation flux density is provided in the gap portion of the magnetic core where the concentration of magnetic flux is extreme.

However, the magnetic head for magneto-optical recording uses a gapless "U"-shaped magnetic core as described hereinbefore in order to generate a uniform perpendicular magnetic field in a considerably wide region of a square of several tens of μm to several hundred μm, readily causing saturation of magnetic flux inside the magnetic core. Therefore, the means for solving the problem, such as the MIG head, for the magnetic disk apparatus, cannot be employed for the magnetic head for magneto-optical recording.

As explained, the problem related to the saturation flux density in the magnetic head for magneto-optical recording is different in background and solution from the similar problem in the magnetic head for the magnetic disk apparatus.

There are various proposals of overwritable magneto-optical recording/reproducing apparatus in which a light beam irradiates a magnetic recording medium of disk type and information is recorded by the magnetic modulation method in the recording medium irradiated by the light beam (see Japanese Laid-Open Patent Application No. 51-107121, Japanese Laid-Open Patent Application No. 63-217548, Japanese Laid-Open Patent Application No. 59-215008, Japanese Patent Publication No. 60-48806, etc.). To overwrite information in the magneto-optical recording medium, a magnetic head slider with a magnetic coil and core disposed thereon is arranged to face the rotating magneto-optical recording medium, so that the magnetic head slider is floated over the magneto-optical recording medium by an air flow caused between them. Thus, as long as the magneto-optical recording medium is rotated at a certain rotation speed, the air flow keeps the magnetic head slider from being worn and damaged during recording, reproduction or erasing in the magneto-optical recording/reproducing apparatus.

At the drive start or at the drive end of the magneto-optical recording medium, however, the magnetic head slider loses the floating force because of the drop of relative rotation speed, which makes the magnetic head slider slide directly on the magneto-optical recording medium.

Further, the floatation stability could be lost due to a greater acceleration exerted when the magnetic head is under a seek operation at high speed, so that the magnetic head slider could contact with the recording medium, whereby the magnetic head slider is liable to be worn and damaged. To avoid such a situation, a high-hardness ceramic CaO—$TiO_2$ with Vickers hardness of 800 to 900 is normally used to make the slider in the normal optical head for magneto-optical recording. The following problems are recognized in use of a slider made of such a material.

First, since the slider is very hard as compared with the surface of a medium and the lubricity thereof is not enough, the medium surface could be worn and damaged upon contact between the magnetic head slider and the medium as described above, which could interfere with the correct recording or reproduction of signals.

Second, since the ceramic CaO—$TiO_2$ has a high electrical resistivity of about $3 \times 10^{12}$ Ω·cm, the friction against the medium surface with high electrical resistivity of the same level will easily produce static electricity on them. The static electricity could cause dust floating in air to attach to the surface of the slider or medium. In addition, an attractive force of static electricity could bring the slider into contact with the medium, resulting in occurrence of head crush.

Third, since the ceramic CaO—$TiO_2$ has a small thermal expansion coefficient in the range of about $90 \times 10^4$ to $118 \times 10^{-7}$ [1/°C.], the thermal stress upon glass fusion bonding of the magnetic head could cause cracks. To avoid formation of cracks, the material for the core is limited to ferrites having a thermal expansion coefficient close to that of the ceramic CaO—$TiO_2$.

In order that the thermal expansion coefficient is kept within the above required range for the ferrites mainly containing MnO, ZnO and $Fe_2O_3$ suitable for such use, the composition rate of $Fe_2O_3$ must be not more than 52 mol %. Nevertheless, the ferrites with such a composition have an effective saturation magnetic flux density of not more than 5400 G, which makes it difficult to obtain a generating magnetic field strong enough to carry out high-density signal recording.

Next described are specific embodiments of magnetic heads for magneto-optical recording according to the present invention, which solve the above problems.

First in an embodiment of a magnetic head for magneto-optical recording according to the present invention, the magnetic core M is made of sample $E_1$ or $E_2$, which is described before with reference to Table 2 as a Mn—Zn ferrite having a saturation flux density $B_{10}$ of above 5400 G at 25° C. or above 4200 G at 92° C. Further, the slider S is made of a non-magnetic material having a thermal expansion coefficient of from $120 \times 10^{-7}$ [1/°C.] to $150 \times 10^{-7}$ [1/°C.] in the temperature range of 20° C. to 500° C., specifically a ceramic mainly containing NiO with at least one or more additives of CaO, $TiO_2$, MgO and MnO. The magnetic core is bonded to the slider by glass bonding. Such a ceramic is for example sample $S_3$, $S_4$ or $S_5$ shown in Table 3.

TABLE 3

| Sample | Composition | Thermal expansion coef. [1/°C.] | Hardness [kg/mm$^2$] |
|---|---|---|---|
| $S_3$ | NiO—CaO—TiO$_2$ | $140 \times 10^{-7}$ | 830 |
| $S_4$ | NiO—MnO | $134 \times 10^{-7}$ | 600 |
| $S_5$ | NiO—MgO | $130 \times 10^{-7}$ | 800 |

Although the main ingredient NiO itself has a considerably large thermal expansion coefficient of $160 \times 10^{-7}$ [1/°C.], the formulation of additives at a suitable rate as described above can provide ceramics with a desired thermal expansion coefficient of between $120 \times 10^{-7}$ and $150 \times 10^{-7}$ [1/°C.]. This is not further detailed herein, but it is described in detail for example in Japanese Patent Publication No. 3-45024. The content of main ingredient NiO is for example 30 to 70 mol %.

Either one of these samples has a Vickers hardness of not less than 500 [kg/mm$^2$], and therefore has sufficient wear resistance for a slider. The greater thermal expansion coefficient than that of the ordinary CaO—TiO$_2$ ceramic enables glass bonding with the magnetic core made of the Mn—Zn ferrite having a large saturation flux density $B_{10}$. For example, available combinations are between sample $S_4$ or $S_5$ of ceramic as described above. The two samples in each combination have respective thermal expansion coefficients approximately coincident with each other (within the allowable difference of $5 \times 10^{31\ 7}$ [1/°C.]).

Next described is another embodiment of a magnetic head for magneto-optical recording according to the present invention. In the present embodiment, the magnetic core M is made of the aforementioned sample $E_1$ or $E_2$, which is the Mn—Zn ferrite with saturation flux density $B_{10}$ of above 5400 G at 25° C. or above 4200 G at 92° C., similarly as in the embodiment shown in Table 3. Further, the slider S is made of a non-magnetic material having a thermal expansion coefficient of from $120 \times 10^{-7}$ [1/°C.] to $150 \times 10^{-7}$ [1/°C.] in the temperature range of 20° C. to 500° C., specifically of crystallized glass. Such crystallized glass may be for example samples $S_6$, $S_7$, $S_8$ or $S_9$ shown in Table 4.

TABLE 4

| Sample | Composition | Thermal expansion coef. [1/°C.] | Hardness [kg/mm$^2$] |
|---|---|---|---|
| $S_6$ | Li$_2$O—SiO$_2$ | $145 \times 10^{-7}$ | 700 |
| $S_7$ | Li$_2$O—SiO$_2$ | $122 \times 10^{-7}$ | 610 |
| $S_8$ | Al$_2$O$_3$—ZnO—SiO$_2$ | $137 \times 10^{-7}$ | 970 |
| $S_9$ | Li$_2$O—ZnO—SiO$_2$ | $134 \times 10^{-7}$ | 600 |

The samples listed here are examples among many, and by selecting a proper composition and composition rate another crystallized glass can be obtained with a desired thermal expansion coefficient of between $120 \times 10^{-7}$ [1/°C.] and $150 \times 10^{-7}$ [1/°C.] in addition to the samples.

Each of these samples has a Vickers hardness of not less than 500 [kg/mm$^1$], presenting sufficient wear resistance for a slider. Also, since the thermal expansion coefficient is larger than that of ordinary CaO—TiO$_2$ ceramic, the slider can be bonded by glass bonding to the magnetic core made of the Mn—Zn ferrite with large saturation flux density $B_{10}$. For example, there are available combinations between sample $E_1$ of Mn—Zn ferrite and sample $S_6$ of crystallized glass and between sample $E_2$ of Mn—Zn ferrite and sample $S_9$ of crystallized glass as described above, in each of which the thermal expansion coefficients of the two samples are made approximately coincident with each other (within the allowable difference of $5 \times 10^{-7}$ [1/°C.]).

Figure 20:
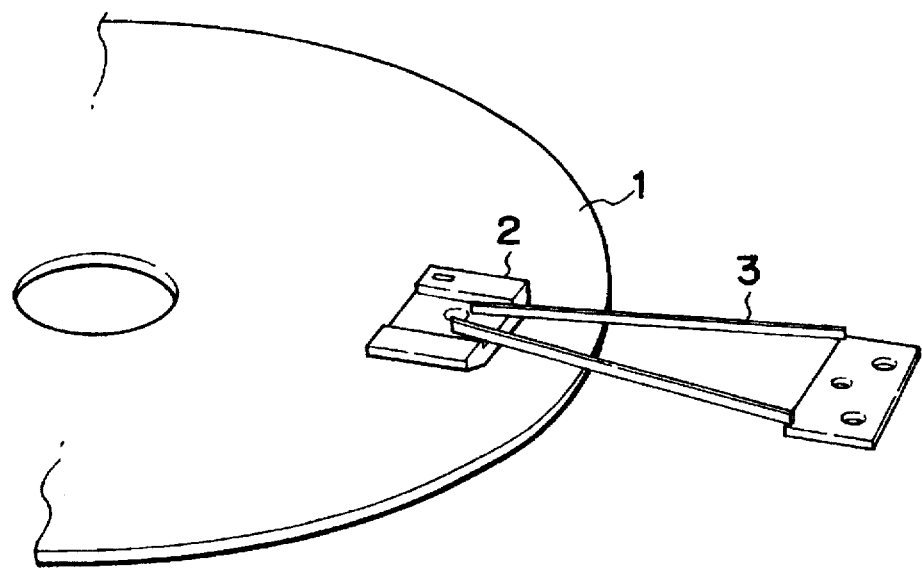
FIG. 20 is a perspective view to show a state of use of a magnetic head of the present invention.
Figure 21:
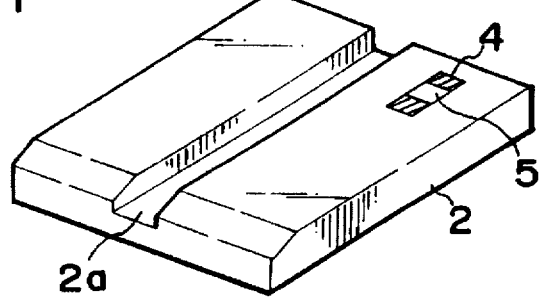
FIG. 21 is a perspective view to show an embodiment of a magnetic head of the present invention.
Figure 22:
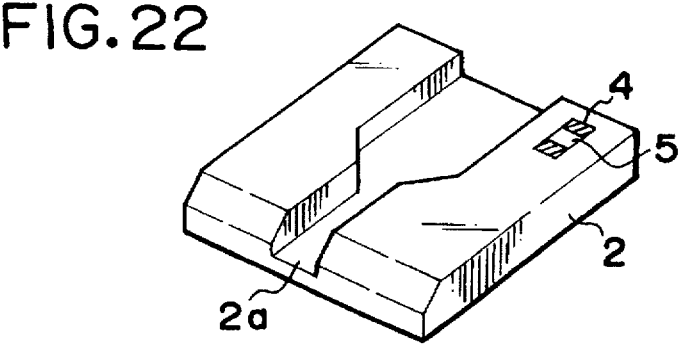
FIG. 22 is a perspective view to show another embodiment of a magnetic head of the present invention.

FIG. 20 is a perspective view to show a state of the magnetic head for magneto-optical recording according to the present invention in use, FIG. 21 a perspective view to show an embodiment of a magnetic head of the present invention, and FIG. 22 a perspective view to show another embodiment of a magnetic head of the present invention. In these figures, reference numeral 1 designates a magneto-optical recording medium of a disk driven by a spindle motor (not shown). A magnetic head slider 2 made of a non-magnetic material is disposed to face the upper surface of the recording medium. The magnetic head slider 2 is elastically held by spring arms 3 and has a flat slider portion with slit 2a extending in the slide direction through the center thereof as shown in FIG. 21 or FIG. 22. Provided in the slider is a core 4 made of a ferrite mainly containing MnO, ZnO, and Fe$_2$O$_3$. In a case that the slider 2 is made specifically of a non-magnetic ceramic, the core 4 is bonded to the slider by glass fusion bonding (numeral 5 denotes a fusion bonding portion). In a case that the slider is made of a resin, the core 4 is integrally molded with slider 2. The core 4 is of "U" shape, the open end of which faces the medium. A coil is wound around the core 4 and the generating magnetic field is modulated by a current supplied to the coil. The overall construction of the magnetic head for magneto-optical recording according to the present invention shown in FIG. 21 or FIG. 22 is the same as that described with FIG. 2, and the magnetic head is used in the magneto-optical recording apparatus shown in FIG. 1.

Especially in the present invention, at least the portion of slider 2 facing the medium should be made of a material with electrical resistivity of not more than $1 \times 10^{11}$ Ω·cm, more preferably with a surface hardness of Vickers hardness not less than 500. For example in the above embodiments, the entire magnetic head slider 2 including the portion facing the medium may be made by formulating a cationic surface active agent or an anionic surface active agent as an anti-static agent component in a thermosetting resin, thermoplastic resin or photo-setting resin with lubricity and molding the formulation. Specific examples of the resins are fluorinated resins and silicon-modified resins. In a case that the slider is made of a resin material, the sufficient surface hardness (Vickers hardness not less than 500) cannot be attained. To compensate for a lack of hardness, it is important to give sufficient lubricity to the material.

The magnetic head slider 2 may be made such that at least the portion facing the medium is provided on the surface thereof with a coating of lubricating thin film made from a material obtained by formulating a cationic surface active agent or an anionic surface active agent as an anti-static agent component in a material selected from the group of fluorine-containing compounds or perfluoropolyoxyalkylenes.

Also, the slider may be made of a non-magnetic ceramic mainly containing at least one of MnO, NiO and MgO (in which the total content of MnO, NiO and MgO is for example not less than 60 mol %) or a non-magnetic ceramic mainly containing NiO with at least one or more additives of CaO, TiO$_2$, MgO and MnO. In this case, at least the portion of the slider facing the medium can have a surface hardness of Vickers hardness not less than 500. Of course, the ceramic slider may have the coating of a lubricating thin film.

The effect of the invention enjoyed by specifying the materials as detailed above is described below with the following result of experiments.

EXAMPLE 1

The material of magnetic head slider 2 was a resin composition in which 1% by weight of pyridinium salt was formulated as a cationic surface active agent in a fluorinated polyimide. Monomers for the fluorinated polyimide were diamine, for example 2,2'-bis (trifluoromethyl)-4,4'-diaminobiphenyl, and acid dianhydride, for example pyromellitic dianhydride 2,2-bis(3,4-dicarboxypheynyl)-hexafluoropropane dianhydride, and in this example the two types of polyimide components as described were mixed with each other in a monomer state and then copolymerized for use. The magnetic head slider made of the material was subjected to the durability test of 100000 cycles of a CSS test (Contact Start Stop Test). After the durability test, there was neither damage on the magneto-optical recording medium surface nor crushing of the side of the magnetic head slider. The surface electrical resistivity of the slider was $8.5 \times 10^8$ $\Omega \cdot$cm.

EXAMPLE 2

The magnetic head slider was made of a ceramic CaO—$TiO_2$. A lubricating thin film was formed on the surface of the slider by dipping it in a solution in which 1.5% by weight of sulfonic acid was formulated as an anionic surface active agent in CRYTOX 143AC solution represented by a formula of $[CF(CF_3)CF_2—O]_n$—$CF$ $(CF_3)$ $CF_3$ where n is 28 in average and slowly lifting it. After that, hardening treatment was subjected to the durability test of 100000 cycles of a CSS test in the same manner as above. After the test, there was observed neither damage on the magneto-optical recording medium surface nor crushing of the magnetic head slider side. The surface electrical resistivity of the slider was $7.0 \times 10^8$ $\Omega \cdot$cm.

Comparative Example

As a comparative example, the magnetic head slider was made of a conventional material, that is, the ceramic CaO—$TiO_2$ without a lubricating thin film. The surface electrical resistivity of the slider was $3 \times 10^{12}$ $\Omega \cdot$cm. After the durability test of 100000 cycles of CSS, crushing of the slider and damage on the medium surface were caused by a lack of lubricity and a charge of static electricity.

EXAMPLE 3

The magnetic head slider was made of a non-magnetic ceramic mainly containing MgO and NiO (in which the MgO content was 50 mol % and the NiO content was 50 mol %). The surface electrical resistivity was $1 \times 10^8$ $\Omega \cdot$cm and the surface hardness was Vickers hardness 800. Additionally, another magnetic head slider was made of a non-magnetic ceramic mainly containing MnO and NiO (in which the MnO content was 60 mol % and the NiO content was 40 mol %). The surface electrical resistivity was $4 \times 10^{10}$ $\Omega \cdot$cm and the surface hardness was Vickers hardness 650. Further, another magnetic head slider was made of a non-magnetic ceramic mainly containing 60 mol % of NiO with additives of 10 mol % of CaO and 30 mol % of $TiO_2$. The surface electrical resistivity was $6 \times 10^8$ $\Omega \cdot$cm and the surface hardness was Vickers hardness 830. These magnetic heads were subjected to the durability test of 100000 cycles of a CSS. Little charge of static electricity was observed on the surface of the slider or medium and no damage due to crushing was caused. Further, the above ceramics had a thermal expansion coefficient in the range of from $130 \times 10^{-7}$ to $140 \times 10^{-7}$ [1/° C.], which was almost equal to a thermal expansion coefficient of a core material of the magnetic head which was a ferrite with 58–64 mol % of $Fe_2O_3$. No cracks appeared upon glass bonding. The above ferrite had the effective saturation flux density $B_{10}$ of 5700–6000 G, with which the generating magnetic field was stronger by about 15–20% than that of the conventional magnetic heads. Satisfactory signal recording was done by using the thus formed magnetic heads.

Figure 23:
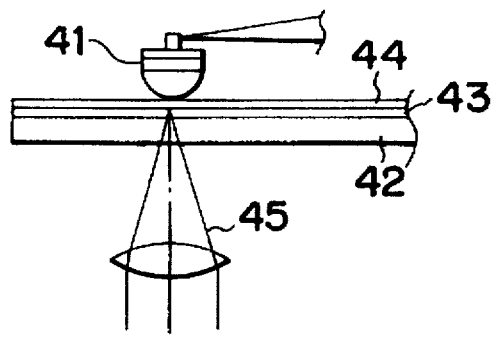
FIG. 23 is a schematic drawing to show still another embodiment of a magnetic head of the present invention.
Figure 24:
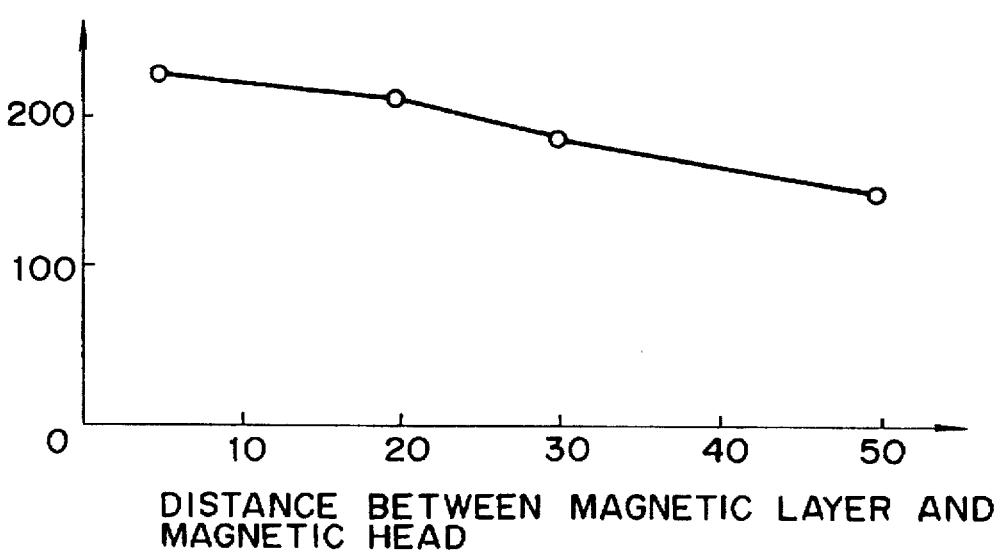
FIG. 24 is a drawing to show the relation of magnetic field intensity of a magnetic layer to distance between a magnetic layer and a magnetic head.

Since the magnetic heads for magneto-optical recording according to the present invention as described above have the lubricity and the anti-static property, they can be arranged as magnetic heads of slide type as shown in FIG. 23. In detail, the magnetic field generating surface of magnetic head 41 is processed in the form of a convex surface, which is brought into contact with a protection layer 44 in a recording medium (having a substrate 42, a magnetic layer 43 for recording and protection layer 44) and is slid under contact. Reference numeral 45 designates a laser beam. This arrangement can shorten the distance between the magnetic layer 43 in the recording medium and the magnetic head 41 as compared with the floating magnetic head using the slider, whereby the magnetic field intensity is made greater on the magnetic layer 43 and disturbance of recording signals due to the surface fluctuation of the recording medium can be reduced. FIG. 24 shows an example of a relation of magnetic field intensity of the magnetic layer to distance between the magnetic layer and the magnetic head.

As described above, the magnetic head for magneto-optical recording according to the present invention is characterized in that the magnetic core made of the Mn—Zn ferrite with saturation flux density $B_{10}$ of above 5400 G at 25° C. or above 4200 G at 92° C. is bonded by glass bonding to the slider made of the non-magnetic material with a thermal expansion coefficient of from $120 \times 10^{-7}$ [1/°C.] to $150 \times 10^{-7}$ [1/°C.] in the temperature range of 20° C. to 500° C. Also, the magnetic head is characterized particularly in that the non-magnetic material is the ceramic mainly containing NiO with at least one or more additives of CaO, $TiO_2$, MgO and MnO, or crystallized glass.

Although in the magnetic head for magneto-optical recording according to the present invention the Mn—Zn ferrite with greater saturation flux density $B_{10}$ than the conventional materials is used for the magnetic core, the glass bonding is possible because the thermal expansion coefficient is almost coincident with that of the slider. Also, the slider has the sufficient Vickers hardness of not less than 500 [kg/mm$^2$] presenting sufficient wear resistance. Therefore, the magnetic head of the present invention is of high practical use.

Since the saturation flux density of the magnetic core is increased as described as compared with the conventional magnetic cores, the saturation of magnetic flux is unlikely to occur inside the magnetic core upon high-frequency modulation of the magnetic field. Thus higher-speed signal recording can be realized by raising the upper limit of the frequency of recording signals, which was conventionally about 6 MHz. For example, in a case that the magnetic core is made of the aforementioned Mn—Zn ferrite sample $C_1$ and the slider of the aforementioned ceramic sample $S_3$ or crystallized glass sample $S_6$, the thermal expansion coefficients thereof are almost coincident with each other, which enables glass bonding. This magnetic head can be used with a recording signal frequency of about 12.6 MHz at the highest. Additionally, in a case that the magnetic core is made of the aforementioned Mn—Zn ferrite sample $C_2$ and the slider of the aforementioned ceramic sample $S_4$ or $S_5$ or the crystallized glass sample $S_9$, the glass bonding is also possible. This magnetic head can be used with a recording signal frequency of about 10 MHz at the highest.

As described above, the magnetic head for magneto-optical recording according to the present invention is so arranged that the surface electrical resistivity is not more than $1 \times 10^{11}$ Ω·cm in at least the portion of the slider facing the magneto-optical recording medium, further preferably, in addition to the foregoing, that the slider is provided with a resin material with a lubricity and anti-static property at least in the portion of the slider facing the magneto-optical recording medium or that the slider is made of a non-magnetic ceramic, whereby even if the magnetic head is brought into contact with the medium because of disturbance of floatation stability caused by a decrease of relative rotation speed between the magneto-optical recording medium and the magnetic head slider or by a high-speed seek operation of the magnetic head, accumulation of electrostatic charge can be prevented so as to prevent adherence of dust or electrostatic contact between the slider and recording medium and thereby the surface of the magneto-optical recording medium can be kept from being damaged, also avoiding crushing of the magnetic head slider itself.

Further, since the magnetic head slider of slide type is provided with the resin material with the lubricity and anti-static property at least in the portion facing the magneto-optical recording medium, the magnetic field modulation recording property may also be improved. Further, if the slider is made of the non-magnetic ceramic mainly containing at least one of MnO, NiO and MgO or the non-magnetic ceramic mainly containing NiO with at least one or more additives of CaO, $TiO_2$, MgO and MnO, the thermal expansion coefficient can be set large in the range of from $120 \times 10^{-7}$ to $150 \times 10^{-7}$ [1/°C.], which is almost equal to the thermal expansion coefficient in the case that the material for the core of the magnetic head is the ferrite mainly containing MnO, ZnO and $Fe_2O_3$ in which the $Fe_2O_3$ content is above 52 mol %, causing no cracks upon glass fusion bonding. The use of ferrite increases the effective saturation flux density $B_{10}$ up to above 5400 G, whereby a magnetic field can be generated with an intensity necessary for satisfactory signal recording.

What is claimed is:

1. A magnetic head for magneto-optical recording comprising:

a slider sliding on a magneto-optical recording medium;

a core made of a magnetic material and mounted to said slider, said core having an area of a main magnetic pole end face of from 0.01 $mm^2$ to 0.039 $mm^2$, the magnetic material for the core being a Mn—Zn ferrite having a Curie temperature of not less than 140° C., a permeability of not less than 200 at frequency 8 MHz at temperature 25° C., and an effective saturation magnetic flux density $B_{10}$ of not less than 4400 G; and a coil wound around said core.

2. A magnetic head for magneto-optical recording according to claim 1, wherein upon application of a voltage to said coil a modulation magnetic field is applied to a recording surface of the magneto-optical recording medium to record an information signal.

3. A magnetic head for magneto-optical recording comprising:

a slider sliding on a magneto-optical recording medium;

a core made of a magnetic material and mounted to said slider, said core having an area of a main magnetic pole end face of from 0.01 $mm^2$ to 0.039 $mm^2$, the magnetic material for the core being a Mn—Zn ferrite having a Curie temperature of not less than 170° C., a permeability of not less than 200 at frequency 10 MHz at temperature 25° C., and an effective saturation magnetic flux density $B_{10}$ of not less than 5000 G; and a coil wound around said core.

4. A magnetic head for magneto-optical recording according to claim 3, wherein upon application of a voltage to said coil a modulation magnetic field is applied to a recording surface of the magneto-optical recording medium to record an information signal.

5. A magnetic head for magneto-optical recording, comprising:

a slider sliding on a magneto-optical recording medium;

a core made of a magnetic material and mounted to said slider, said core having an area of a main magnetic pole end face of from 0.01 $mm^2$ to 0.039 $mm^2$, the magnetic material for the core being a Mn—Zn ferrite having a Curie temperature of not less than 200° C., a permeability of not less than 200 at frequency 12 MHz at temperature 25° C., and an effective saturation magnetic flux density $B_{10}$ of not less than 5500 G; and a coil wound around said core.

6. A magnetic head for magneto-optical recording according to claim 5, wherein upon application of a voltage to said coil a modulation magnetic field is applied to a recording surface of the magneto-optical recording medium to record an information signal.

7. A magnetic head for magneto-optical recording according to claim 1, wherein said magnetic head is of a composite type in which said core with the main magnetic pole is fixed to the floating slider of non-magnetic material, the end face of the main magnetic pole of said core is substantially rectangular, and the area of the end face is in the range of from 0.01 $mm^2$ to 0.039 $mm^2$.

8. A magnetic head for magneto-optical recording according to claim 1, wherein a distance between the end face of the main magnetic pole in said core and said coil is in the range of from 0.05 mm to 0.29 mm.

9. A magnetic head for magneto-optical recording according to claim 1, wherein an area of a coil winding window in said core is in the range of from 0.11 $mm^2$ to 0.47 $mm^2$.

10. A magnetic head for magneto-optical recording according to claim 1, wherein said coil is formed by winding a conductor wire with a cross section of the conductor wire being in the range of from $7 \times 10^{-4}$ $mm^2$ to $5 \times 10^{-3}$ $mm^2$.

11. A magnetic head for magneto-optical recording according to claim 1, wherein said coil has an inductance of from 0.4 μH to 2 μH.

12. A magneto-optical recording apparatus comprising:

an optical head for irradiating a magneto-optical recording medium with a light spot; and a magnetic head for applying a magnetic field to the magneto-optical recording medium, said magnetic head comprising a slider sliding on the magneto-optical recording medium, a core made of a magnetic material and mounted to said slider, and a coil wound around said core, wherein upon application of a voltage to said coil a modulation magnetic field is applied to a recording surface of the magneto-optical recording medium to record an information signal with a maximum frequency of not less than about 8 MHz, and wherein the magnetic material for the core is a Mn—Zn ferrite having a Curie temperature of not less than 140° C., a permeability of not less than 200 at frequency 8 MHz at temperature 25° C., and an effective saturation magnetic flux density $B_{10}$ of not less than 4400 G.

13. A magneto-optical recording apparatus comprising:

an optical head for irradiating a magneto-optical recording medium with a light spot; and a magnetic head for applying a magnetic field to the magneto-optical recording medium, said magnetic head comprising a slider sliding on the magneto-optical recording medium, a core made of a magnetic material and mounted to said slider, and a coil wound around said core, wherein upon application of a voltage to said coil a modulation magnetic field is applied to a recording surface of the magneto-optical recording medium to record an information signal with a maximum frequency of not less than about 10 MHz, and wherein the magnetic material for the core is a Mn—Zn ferrite having a Curie temperature of not less than 170° C., a permeability of not less than 200 at frequency 10 MHz at temperature 25° C., and an effective saturation magnetic flux density $B_{10}$ of not less than 5000 G.

14. A magneto-optical recording apparatus comprising:

an optical head for irradiating a magneto-optical recording medium with a light spot; and a magnetic head for applying a magnetic field to the magneto-optical recording medium, said magnetic head comprising a slider sliding on the magneto-optical recording medium, a core made of a magnetic material and mounted to said slider, and a coil wound around said core, wherein upon application of a voltage to said coil a modulation magnetic field is applied to a recording surface of the magneto-optical recording medium to record an information signal with a maximum frequency of not less than about 12 MHz, and wherein the magnetic material for the core is a Mn—Zn ferrite having a Curie temperature of not less than 200° C., a permeability of not less than 200 at frequency 12 MHz at temperature 25° C., and an effective saturation magnetic flux density $B_{10}$ of not less than 5500 G.

15. A magnetic head for magneto-optical recording according to claim 3, wherein said magnetic head is of a composite type in which the core the main magnetic pole is fixed to the floating slider of a non-magnetic material, the end face of the main magnetic pole of said core is substantially rectangular, and the area of the end face is in the range of from 0.01 mm² to 0.039 mm².

16. A magnetic head for magneto-optical recording according to claim 3, wherein a distance between the end face of the main magnetic pole in said core and said coil is in the range of from 0.05 mm to 0.29 mm.

17. A magnetic head for magneto-optical recording according to claim 3, wherein an area of a coil winding window in said core is in the range of from 0.11 mm² to 0.47 mm².

18. A magnetic head for magneto-optical recording according to claim 3, wherein said coil is formed by winding a conductor wire with a cross section of the conductor wire being in the range of from $7 \times 10^{-4}$ mm² to $5 \times 10^{-3}$ mm².

19. A magnetic head for magneto-optical recording according to claim 3, wherein said coil has an inductance of from 0.4 µH to 2 µH.

20. A magnetic head for magneto-optical recording according to claim 1, wherein said magnetic head is of a composite type in which said core with the main magnetic pole is fixed to said slider, which is of a non-magnetic material.

21. A magnetic head for magneto-optical recording according to claim 3, wherein said magnetic head is of a composite type in which said core with the main magnetic pole is fixed to said slider, which is of a non-magnetic material.

22. A magnetic head for magneto-optical recording according to claim 5, wherein said magnetic head is of a composite type in which said core with the main magnetic pole is fixed to the slider, which is a non-magnetic material.

23. A magnetic head for magneto-optical recording according to claim 5, wherein a distance between the end face of the main magnetic pole in said core and said coil is in the range of from 0.05 mm to 0.29 mm.

24. A magnetic head for magneto-optical recording according to claim 5, wherein an area of a coil winding window in said core is in the range of from 0.11 mm² to 0.47 mm².

25. A magnetic head for magneto-optical recording according to claim 5, wherein said coil is formed by winding a conductor wire with a cross section of the conductor wire being in the range of from $7 \times 10^{-4}$ mm² to $5 \times 10^{-3}$ mm².

26. A magnetic head for magneto-optical recording according to claim 5, wherein said coil has an inductance of from 0.4 µH to 2 µH.

* * * * *

UNITED STATES PATENT AND TRADEMARK OFFICE
CERTIFICATE OF CORRECTION

PATENT NO. : 5,689,478
DATED : November 18, 1997
INVENTOR(S) : KAZUYOSHI ISHII, ET AL.

It is certified that error appears in the above-identified patent and that said Letters Patent is hereby corrected as shown below:

COLUMN 15:

Line 30, "$5 \times 10^{31\ 7}$" should read --$5 \times 10^{-7}$--; and
In Table 4, for Sample $S_9$, under "Hardness", "600" should read --740--.

COLUMN 21:

Line 40, "core" should read --core with--.

Signed and Sealed this

Nineteenth Day of May, 1998

Attest:

BRUCE LEHMAN

*Attesting Officer*  *Commissioner of Patents and Trademarks*